United States Patent
Pradeep

(10) Patent No.: US 12,453,510 B2
(45) Date of Patent: *Oct. 28, 2025

(54) NEUROMODULATION METHOD AND SYSTEM FOR SLEEP DISORDERS

(71) Applicant: StimScience Inc., Berkeley, CA (US)

(72) Inventor: Anantha K. Pradeep, Piedmont, CA (US)

(73) Assignee: STIM SCIENCE INC., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,881

(22) Filed: Jun. 4, 2021

(65) Prior Publication Data
US 2021/0290155 A1    Sep. 23, 2021

Related U.S. Application Data

(63) Continuation of application No. 16/195,634, filed on Nov. 19, 2018, now abandoned, and a (Continued)

(51) Int. Cl.
*A61B 5/00* (2006.01)
*A61N 1/00* (2006.01)
(Continued)

(52) U.S. Cl.
CPC .......... *A61B 5/4836* (2013.01); *A61B 5/4064* (2013.01); *A61B 5/4806* (2013.01);
(Continued)

(58) Field of Classification Search
None
See application file for complete search history.

(56) References Cited

U.S. PATENT DOCUMENTS 5,919,144 A * 7/1999 Bridger ............ A61B 5/031
600/587
7,885,706 B2   2/2011 Ludvig et al.
(Continued)

FOREIGN PATENT DOCUMENTS

EP    2314346 A1    4/2011
WO    2016110804 A1    7/2016
(Continued)

OTHER PUBLICATIONS

Hutcheon, B., & Yarom, Y. (2000). Resonance, oscillation and the intrinsic frequency preferences of neurons. Trends in Neurosciences, 23(5), 216-222 (Year: 2000).*

(Continued)

*Primary Examiner* — Niketa Patel
*Assistant Examiner* — Anant A Gupta
(74) *Attorney, Agent, or Firm* — SCHWEGMAN LUNDBERG & WOESSNER, P.A.

(57) ABSTRACT

Provided are systems, methods, and devices for providing mediation or alleviation of sleep disorders and insomnia. Systems may include an interface, processing devices, and a controller. The interface is configured to obtain measurements from a brain of a user with sleeping disorders and insomnia. A first processing device is configured to generate multiple brain state parameters characterizing one or more features of a brain state of the user. A second processing device is configured to generate models of the brain of the user based on the plurality of brain state parameters and the plurality of measurements, and determine, using the models and training data comprising one or more mediation data points, a mediation procedure for reducing one or more symptoms of the sleeping disorder or insomnia. The mediation procedure is provided to one or more entities, and one
(Continued)

or more control signals are generated by the controller based on the mediation procedure.

20 Claims, 19 Drawing Sheets

Related U.S. Application Data continuation-in-part of application No. 17/170,521, filed on Feb. 8, 2021, now Pat. No. 11,633,595, which is a continuation of application No. 15/290,391, filed on Oct. 11, 2016, now Pat. No. 10,946,196, which is a continuation-in-part of application No. 14/083,379, filed on Nov. 18, 2013, now abandoned.

(60) Provisional application No. 61/796,634, filed on Nov. 16, 2012, provisional application No. 61/962,689, filed on Nov. 14, 2013.

(51) Int. Cl.
*A61N 1/04* (2006.01)
*A61N 1/20* (2006.01)
*A61N 1/36* (2006.01)

(52) U.S. Cl.
CPC .............. *A61N 1/0472* (2013.01); *A61N 1/20* (2013.01); *A61N 1/36025* (2013.01)

(56) References Cited

U.S. PATENT DOCUMENTS

| | | | |
|---|---|---|---|
| 8,583,238 | B1 | 11/2013 | Heldman et al. |
| 9,198,612 | B2* | 12/2015 | Fueyo ................... A61B 5/417 |
| 10,946,196 | B2 | 3/2021 | Weisend |
| 11,064,938 | B2* | 7/2021 | Pradeep ................. A61B 5/369 |
| 11,633,595 | B2 | 4/2023 | Weisend |
| 2002/0082514 | A1 | 6/2002 | Williams et al. |
| 2005/0070971 | A1* | 3/2005 | Fowler ............... A61N 1/36082 607/45 |
| 2005/0228461 | A1 | 10/2005 | Osorio |
| 2009/0192556 | A1 | 7/2009 | Wu et al. |
| 2009/0259137 | A1 | 10/2009 | Delic et al. |
| 2011/0028827 | A1* | 2/2011 | Sitaram ................ A61B 5/7267 600/410 |
| 2011/0046503 | A1 | 2/2011 | Pradeep et al. |
| 2011/0137371 | A1 | 6/2011 | Giftakis et al. |
| 2011/0201944 | A1 | 8/2011 | Higgins |
| 2011/0224572 | A1* | 9/2011 | Gilja ....................... G06F 3/015 600/545 |
| 2012/0041330 | A1* | 2/2012 | Prichep ................. A61B 5/291 600/544 |
| 2012/0179019 | A1 | 7/2012 | Fadem |
| 2012/0203134 | A1* | 8/2012 | Kinrot .................. A61B 5/4064 600/547 |
| 2012/0296390 | A1 | 11/2012 | Nakashima et al. |
| 2013/0131461 | A1 | 5/2013 | Jorge et al. |
| 2013/0184779 | A1 | 7/2013 | Bikson |
| 2014/0350634 | A1* | 11/2014 | Grill ..................... A61B 5/4836 607/45 |
| 2015/0174418 | A1* | 6/2015 | Tyler ........................ A61N 7/00 607/45 |
| 2015/0374303 | A1* | 12/2015 | Gelbman ............... A61B 5/441 600/476 |
| 2016/0048753 | A1* | 2/2016 | Sussillo .................... G06N 3/08 706/23 |
| 2016/0206871 | A1 | 7/2016 | Weisend |
| 2017/0087367 | A1* | 3/2017 | Weisend ............... A61B 5/291 |
| 2017/0333696 | A1 | 11/2017 | Shibata |
| 2019/0073030 | A1* | 3/2019 | Lee ....................... B25J 13/087 |
| 2019/0125255 | A1 | 5/2019 | Pradeep |
| 2020/0086127 | A1* | 3/2020 | Intrator .................. A61B 5/374 |
| 2020/0155061 | A1 | 5/2020 | Pradeep |
| 2021/0228877 | A1 | 7/2021 | Weisend |
| 2023/0211160 | A1 | 7/2023 | Weisend |

FOREIGN PATENT DOCUMENTS

| | | | | |
|---|---|---|---|---|
| WO | WO-2018022793 A1 | * | 2/2018 | ........... A61N 1/0529 |
| WO | WO-2018071426 A1 | | 4/2018 | |
| WO | WO-2020061517 A1 | * | 3/2020 | ............ A61N 2/006 |
| WO | 2020106641 A1 | | 5/2020 | |

OTHER PUBLICATIONS

U.S. Appl. No. 16/195,634, Final Rejection, Sep. 2, 2020, 16 pgs.
U.S. Appl. No. 16/195,634, Non-Final Rejection, Apr. 1, 2020, 9 pgs.
U.S. Appl. No. 16/195,634, Non-Final Office Action mailed Mar. 4, 2021, 19 pgs.
Boasso, A.M., Mortimore< H., Silva, R., Aven, L. and Tyler, W.J. Transdermal electrical neuromodulation of the trigeminal sensory nuclear comples improves sleep quality and mood.
Demirtas-Tatlidede et al.: "Noninvasive Brain Stimulation in Traumatic Brain Injury", Journal Head Trauma Rehabilitation, 2012, 27(4): 274-292. Jul. 1, 2012.
Diego Oswaldo Perez Trenard, "Optimal control of non-invasive neuromodulation for the treatment of sleep apnea syndromes" Signal and Image Processing. Universite Rennes 1, 2018.
International Application Serial No. PCT/US19/62053, Preliminary Report on Patentability mailed Jun. 3, 2021, 8 pgs.
International Application Serial No. PCT/US2019/062053, Search Report and Written Opinion mailed Mar. 12, 2020. pp. 12.
Lee, H.J., "Is It Possible to Have Neuromodulation Therapies to Treat Insomnia through Circadian Process Activation?" Chronobiology in Medicine pp. 49-50.
Wagner T. et al.: "Noninvasive Human Brain Stimulation", Annual Review of Biomedical Engineering, 2007, 9:527-565. Feb. 1, 2007.
U.S. Appl. No. 15/290,391, Final Rejection, Jul. 2, 2020, 10 pgs.
U.S. Appl. No. 15/290,391, Office Action Appendix, Nov. 4, 2020, 2 pgs.
U.S. Appl. No. 15/290,391, Examiner Interview Summary Record (Ptol-413), Nov. 4, 2020, 2 pgs.
U.S. Appl. No. 15/290,391, Notice Of Allowance And Fees Due (Ptol-85), Nov. 12, 2020, 9 pgs.
U.S. Appl. No. 15/290,391,Examiner Interview Summary Record (Ptol-413), Dec. 5, 2019, 2 pgs.
U.S. Appl. No. 15/290,391, Final Office Action mailed Aug. 2, 2019.
U.S. Appl. No. 14/083,379, filed Nov. 18, 2013, Variably Configurable, Adaptable Electrode Arrays and Effectuating Software, Methods, and Systems.
U.S. Appl. No. 15/290,391 U.S. Pat. No. 10,946,196, filed Oct. 11, 2016, System for Variably Configurable, Adaptable Electrode Arrays and Effectuating Software.
U.S. Appl. No. 17/170,521, filed Feb. 8, 2021, System for Variably Configurable, Adaptable Electrode Arrays and Effectuating Software.
U.S. Appl. No. 16/195,634, filed Nov. 19, 2018, Neuromodulation Method and System for Sleep Disorders.
U.S. Appl. No. 14/083,379, Final Office Action mailed Jun. 7, 2017, 14 pgs.
U.S. Appl. No. 14/083,379, Non Final Office Action mailed Jan. 4, 2018, 12 pgs.
U.S. Appl. No. 14/083,379, Non Final Office Action mailed Sep. 26, 2016, 60 pgs.
U.S. Appl. No. 14/083,379, Preliminary Amendment filed Mar. 5, 2015, 4 pgs.
U.S. Appl. No. 14/083,379, Response filed Mar. 27, 2017 to Non Final Office Action mailed Sep. 26, 2016, 13 pgs.
U.S. Appl. No. 14/083,379, Response filed Dec. 6, 2017 to Final Office Action mailed Jun. 7, 2017, 10 pgs.
U.S. Appl. No. 15/290,391, Non Final Office Action mailed Nov. 13, 2018, 17 pgs.

(56) References Cited

OTHER PUBLICATIONS

U.S. Appl. No. 15/290,391, Non Final Office Action mailed Dec. 19, 2019, 12 pgs.
U.S. Appl. No. 15/290,391, Office Action Appendix mailed Nov. 4, 2020, 2 pgs.
U.S. Appl. No. 15/290,391, Response filed Apr. 15, 2019 to Non Final Office Action mailed Nov. 13, 2018, 14 pgs.
U.S. Appl. No. 15/290,391, Response filed May 19, 2020 to Non Final Office Action mailed Dec. 19, 2019, 13 pgs.
U.S. Appl. No. 15/290,391, Response filed Aug. 29, 2018 to Restriction Requirement mailed Mar. 1, 2018, 1 pgs.
U.S. Appl. No. 15/290,391, Response filed Oct. 30, 2020 to Final Office Action mailed Jul. 2, 2020, 12 pgs.
U.S. Appl. No. 15/290,391, Response filed Dec. 2, 2019 to Final Office Action mailed Aug. 2, 2019, 13 pgs.
U.S. Appl. No. 15/290,391, Restriction Requirement mailed Mar. 1, 2018, 5 pgs.
U.S. Appl. No. 16/195,634, Response filed Feb. 2, 2021 to Final Office Action mailed Sep. 2, 2020, 11 pgs.
U.S. Appl. No. 16/195,634, Response filed Jul. 1, 2020 to Non Final Office Action mailed Apr. 1, 2020, 8 pgs.
U.S. Appl. No. 17/170,521, Non Final Office Action mailed Aug. 22, 2022, 8 pgs.
U.S. Appl. No. 17/170,521, Preliminary Amendment filed Feb. 8, 2021, 7 pgs.
International Application Serial No. PCT/US2017/055950, International Preliminary Report on Patentability mailed Apr. 25, 2019, 13 pgs.
International Application Serial No. PCT/US2017/055950, International Search Report mailed Jan. 25, 2018, 4 pgs.
International Application Serial No. PCT/US2017/055950, Written Opinion mailed Jan. 25, 2018, 11 pgs.

* cited by examiner

NEUROMODULATION METHOD AND SYSTEM FOR SLEEP DISORDERS

CROSS-REFERENCE TO RELATED APPLICATIONS

This application is a continuation of U.S. patent application Ser. No. 16/195,634 filed on Nov. 19, 2018, which is incorporated herein by reference in its entirety for all purposes. This application is also a continuation-in-part of U.S. patent application Ser. No. 17/170,521 filed on Feb. 8, 2021, which is a continuation of Ser. No. 15/290,391 filed on Oct. 11, 2016 now granted as U.S. Pat. No. 10,946,196, which is a continuation-in-part of U.S. patent application Ser. No. 14/083,379 filed on Nov. 18, 2013 which claims the benefit of priority to U.S. Provisional Patent Application 61/796,634 filed Nov. 16, 2012 and U.S. Provisional Patent Application 61/962,689 filed Nov. 14, 2013, which are incorporated herein by reference in their entirety for all purposes.

TECHNICAL FIELD

The present disclosure relates generally to brain activity, and more specifically to providing relief to users having sleeping disorders, such as insomnia.

DESCRIPTION OF RELATED ART

A human brain may include neurons which exhibit measurable electrical signals when active. Accordingly, various measuring modalities, such as electrodes, may be used to measure such electrical activity. The neural activity of neurons may include a variety of components. In some examples, such electrical activity may be measured and represented as a power spectrum in a frequency domain. Moreover, different behaviors or patterns in different frequency bands may be identified and referred to as particular types of waves, such as delta and theta waves.

A severe reduction of total sleep time and sleep disorders significantly affect physical health and brain functions. In this context, insomnia is a common disturbance of sleep. Chronic insomnia affects physical and mental performance, as well as subjective and objective health state.

The application of electric fields or stimuli to the brain has been demonstrated for a variety of neurological conditions, including the treatment of various disorders. Attempts have been made to utilize such electrical stimuli to aid in alleviating sleep disorders. However, many of the known methods involve invasive surgical procedures that carry considerable risk. While some non-invasive methodologies have begun to show promise, novel devices, systems, networks and methods are needed to address a variety of conditions and circumstances for which electrotherapies can be helpful.

One method for applying electrical stimulation to regions of the brain to facilitate sleep is Conventional Transcranial Direct Current Stimulation (c-TDCS). During a c-TDCS treatment, electrodes are positioned on the head based on general knowledge about cognitive processes and the location of the relevant brain structures that are involved. Thus, in a c-TDCS effort to facilitate working memory, one of the electrodes (anode or cathode) is placed over the left frontal region of the subject's brain, and typically the other will be placed on the right forehead. The c-TDCS approach generally results in 10%-20% gains in the length of retention or the number of items that can be remembered. However, the c-TDCS approach and technology is limited and inapplicable to many circumstances for several reasons, including the ones iterated below.

Methods and systems based upon c-TDCS are optimal, only when the task at hand activates the same brain areas and utilizes the same brain functions as did many previous tasks. Hence, c-TDCS is limited or inapplicable when the details of brain function, in terms of variation between individuals and within individuals over time are considered. With c-TDCS methods, the placement of electrodes is largely speculative.

Third, both the anode and the cathode have effects on brain activity. Placing for the anode and cathode on the head results in enhanced brain activation in regions near the anode and suppressed brain activity in regions near the cathode. The combined enhancement in some brain regions and suppression in others may have unintended consequences in terms of facilitating cognition and significantly complicates the interpretation of the extant data set. These disadvantages mean that c-TDCS is both inaccurate and inapplicable in many circumstances.

Hence, methods for locating the particular regions of the brain to be treated and devices and methods for treating these locations are desirable for the enhancement of sleep and insomnia with non-invasive brain stimulation (NIBS).

External modulation of cortical activity might be suited to affect sleep-wake transition, and transition between sleep stages.

SUMMARY

Provided are systems, methods, and devices for alleviating sleep disorders and insomnia. In one aspect, systems may comprise an interface configured to obtain a plurality of measurements from a brain of a user with insomnia or other sleep disorder, and a first processing device comprising one or more processors configured to generate a plurality of brain state parameters characterizing one or more features of at least one brain state of the brain of the user. The systems may further comprise a second processing device including one or more processors configured to: generate one or more models of the brain of the user based, at least in part, on the plurality of brain state parameters and the plurality of measurements; determine, using the models and training data comprising one or more mediation data points, a procedure for mediation configured to reduce one or more symptoms of the traumatic brain injury; and provide the procedure for mediation to one or more entities. The systems may further comprise a controller comprising one or more processors configured to generate one or more control signals based on the procedure for mediation.

The plurality of measurements represents neural activity of the brain over a given period of time. The plurality of brain state parameters may include deterministic and stochastic observers and estimators of one or more brain states. The plurality of brain state parameters may include a learning estimator model configured to estimate the effects of behavioral or functional responses.

The second processing device may further be configured to: generate diagnostic information based on the one or more models; and transmit a notification message including the diagnostic information to the one or more entities.

The one or more control signals may be transmitted to the interface and the interface may be further configured to generate one or more stimuli based on the one or more control signals.

The systems may further comprise an embedded prosthetic device. The one or more control signals may be transmitted to the embedded prosthetic device and the embedded prosthetic device may be configured to perform an operation based on the control signal. In particular embodiments, the embedded prosthetic device is associated with epileptic seizures.

Other implementations of this disclosure include corresponding methods for providing mediation of traumatic brain injury. For instance, provided methods may comprise obtaining a plurality of measurements, via an interface, from a brain of a user with a traumatic brain injury. The methods further comprise generating, via a first processing device comprising one or more processors, a plurality of brain state parameters characterizing one or more features of at least one brain state of the user.

The methods further comprise, via a second processing device comprising one or more processors: generating one or more models of the brain of the user based, at least in part, on the plurality of brain state parameters and the plurality of measurements; determining, using at least the one or more models of the brain of the user and training data comprising one or more mediation data points, a procedure for mediation configured to reduce one or more symptoms of the traumatic brain injury; and providing the procedure for mediation to one or more entities. The methods further comprise generating one or more control signals, via a controller comprising one or more processors, based on the procedure for mediation.

The methods may further comprise transmitting the one or more control signals to the interface and generating, via the interface, one or more stimuli based on the one or more control signals. The methods may further comprise transmitting the one or more control signals to an embedded prosthetic device, wherein the embedded prosthetic device is configured to perform an operation based on the one or more control signals.

Other implementations of this disclosure include corresponding devices, systems, computer programs, and non-transitory computer readable media configured to perform the described methods.

This and other embodiments are described further below with reference to the figures.

DETAILED DESCRIPTION

Figure 1A:
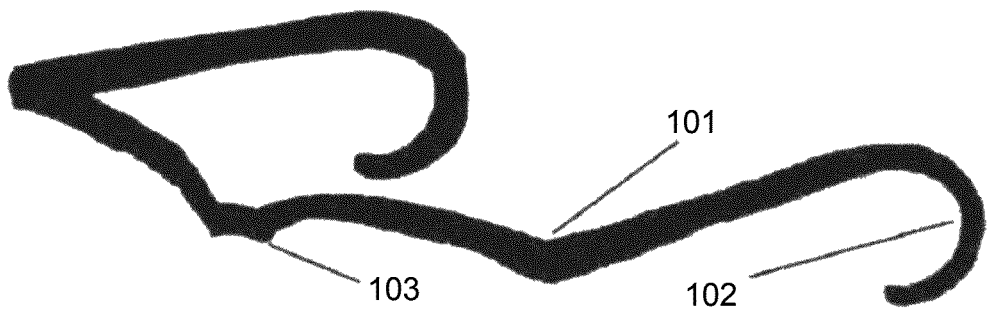
FIGS. 1A and 1B show perspective and end views of one variation of headgear which can be used to facilitate placement of the one or more electrodes relative to the patient's head.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In addition, although many of the components and processes are described below in the singular for convenience, it will be appreciated by one of skill in the art that multiple components and repeated processes can also be used to practice the techniques of the present disclosure.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

The present technology relates to the use of various electrical stimulation, variably configurable and adaptable electrodes and electrode arrays, methods and software for affecting electrical communication systems that naturally occur in the brain, and for affecting various kinds of advantageous neurological intervention, such as alleviating sleep-related disorders and disease. The various types and intensities of electrical stimulation may be adapted and arranged to amplify, or to cancel, targeted portions and functions of the brain. The technology has numerous uses, applications and embodiments.

A non-invasive brain stimulation (NIBS) tool with potential to modulate the cortical state associated to insomnia is transcranial direct current stimulation (tDCS), because of its ability to induce changes in EEG parameters of sleep and wake such as synchronization, and due to its effects on cortical activity and excitability in the waking state.

Generally, insomnia is a sleep disorder that, in the case of primary insomnia, is due to alterations in the neural mechanisms of sleep. In addition, insomnia may be secondary to other diseases or to psychological or physical stress, or may appear as a side effect of different pharmacological agents. Considering that pathologically altered cortical activity can lead to insomnia, neuromodulation via non-invasive brain stimulation (NIBS) tools might be suited to restore adequate cortical activity to promote sleep. tDCS may be useful to modulate cortical activity associated with insomnia and to modulate sleep efficacy.

Modulation of cortical activity might be a feasible target for NIBS interventions in the treatment of sleep disturbances. Some sleep parameters whose physiological mechanisms are well described, as those of REM sleep or the specific EEG activity associated to different stages of non-REM sleep, probably are sensitive to neuromodulation through brain stimulation approaches.

The prefrontal cortex is one of the cortical areas whose modulation via tDCS might influence the physiology and quality of sleep. Via modulation of prefrontal-cerebellar connectivity, combined tDCS could also be a promising approach to modulate the quality of sleep or improve symptoms in some sleep disturbances, such as insomnia.

Transcranial alternating current stimulation (tACS) is an alternative non-invasive brain stimulation (NIBS) method that could be useful in the study of the physiological mechanisms of sleep and as a tool to modulate oscillatory brain activity in relation to sleep disturbances.

Embodiments of the present invention include several methods and devices whereby neurological interventions are effected essentially by electrical NIBS-based procedures accomplished by the devices and methods described herein. These methods and devices are provided to be directed toward specific disorders and treatments, such as sleeping disorders and insomnia. In one aspect, these devices and methods are adapted and arranged to be used on one or a plurality of subject brains for various purposes, affects and results. For instance, the devices and methods described herein provide methods for obtaining more accurate and dependable information that can be gathered from the brains of subjects and for directing electrical NIBS to enhance sleep.

Furthermore, the NIBS methods described herein are guided by advanced neuroimaging methods that quantify the differences between normal sleep patterns and patient populations or difference across time within populations of individuals. The described method identifies patterns of brain activity or anatomy that underlie different brain states, models the patterns of energy distribution in the brain from NIBS devices, and then applies the NIBS device to alter behavior such as sleep.

For instance, electrical NIBS is the first embodiment of neuroimaging-guided non-invasive brain stimulation (ng-NIBS). However, the principles of ng-NIBS are readily expanded to include, e.g., transcranial magnetic stimulation (TMS), repetitive TMS (rTMS), pulsed electromagnetic fields (PEMF), transcranial alternating current stimulation (TACS), transcranial random noise stimulation (TRNS), time varying electrical stimulation (TVES), ultrasound brain stimulation (UBS), etc.

One method for applying ng-NIBS is by utilizing Transcranial Direct Current Stimulation (tDCS or TDCS) which generally delivers a weak current to the brain via electrodes that are affixed to the scalp of a subject. TDCS may temporarily alter brain function for a short period of time where periods of brain function alteration may typically range anywhere from, e.g., 10 to 60 minutes, where the one or more areas of the brain that are affected by TDCS are primarily dependent on the location of the electrodes placed upon the patient's scalp.

One variation of the electrode housing assembly may have one or more individual electrodes arranged in various configurations within the housing body for stimulating the underlying brain region through the patient's scalp. To facilitate the electrical communication from the electrodes to the brain, the electrodes may be housed within or surrounded by an individual cavity or channel designed to hold a medium such as electrically conductive gel (e.g., a pH buffered electrode gel) for facilitating the electrical transmission.

The electrodes are configured in circular shapes (e.g., toroid-shaped) arranged in a planar manner over the electrode housing; however, the electrodes may be formed into other shapes. The electrode housing may be fabricated from a variety of non-porous and non-electrically conductive materials such as polymers or plastics. The toroid-shaped electrodes have shown stability over the treatment time period and they do not leak errant currents on the areas surrounding the skin-electrode interface. These electrodes also maximize the edge length to thereby reduce TDCS-elicited sensations at the skin-electrode interface. Each of the electrodes may have a non-conductive material which is optionally pliable (e.g., rubber, silicone, etc.) surrounding each of the respective electrodes.

The region of the brain for treatment may be located using the targeting methods as described in further detail herein. In use, the electrode housing may be positioned anywhere upon the patient's scalp in proximity to the desired region for treatment, e.g., along the side of the patient's head over the frontal, parietal, temporal, etc. region so long as the electrical stimulation from the electrodes is transmitted through the scalp and into the targeted underlying region of the brain. Additionally, the anodes and cathodes within the electrode housing can be optionally varied or interchanged on the scalp to deliver varied combinations of anodal and cathodal current to the underlying brain depending on the electrode arrangement or pattern to enhance the ability of the treatment procedure to precisely target specific structures within the brain.

Once the targeted region of the brain has been located, the electrode housing may be positioned against the patient's head, e.g., over the frontal or parietal region, and each of the electrodes may be filled with the conductive gel (e.g., a pH buffered electrode gel) or medium to facilitate electrical transmission. The electrode housing may be secured in place against the patient's head through various mechanisms.

In addition to the electrode assembly secured to the patient's scalp, an additional electrode may be secured to a portion of the arm of the subject, e.g., along the upper arm, back, shoulder, neck, or chest. The electrode secured to the non-scalp location may also be in communication with the controller as well.

The electrode-to-head connection impedance may vary from, e.g., 400 to 40,000 ohms, and once applied this impedance may likely change over time and across subjects within the 400 to 40,000 ohm range. When a constant current stimulation is desirable and the electrodes have been desirably positioned upon the patient's head, the electrical stimulation may be applied in a ramped-up manner so that the current is not applied instantly but is applied at an increasing level over a specified period of time. In the event that the impedance is detected to exceed 40,000 ohm, the controller may be programmed to automatically ramp down the stimulation over a specified period of time, e.g., 10 secs. An alert or alarm may be activated and the device may be placed into a pause mode. Once treatment has been completed, the current may also be reduced at a decreasing level over a specified period of time. Ramping up and ramping down the current may help to avoid any side effects affecting the user's skin and/or brain.

The electrode housing may optionally incorporate one or more sensors and/or the controller may be programmed to monitor the impedance after the electrode housing has been applied to the patient's scalp. Before, during, and/or after treatment, the impedance may be monitored to detect for changes in the impedance value. For instance, if a high impedance is detected, the controller may be programmed to provide an alert or alarm to the user or practitioner and the device may automatically terminate the electrical NIBS and/or related functions.

The electrical stimulation may be applied to the user where the initial current, e.g., 0 mA, may be increased over a ramp up period until the treatment level has been reached. The applied electrical stimulation may be applied so that the treatment level is reached over a predetermined period of time during the ramp up period so as to avoid any potential injury to the patient's tissue. For instance, the applied current may be increased over a period of, e.g., 10 secs to 15 mins, during the ramp up period where the current may be increased at intervals of, e.g., 1 sec.

The electrical stimulation parameters may be changed or adjusted by the controller and the stimulation may be applied in a number of different modalities. For instance, the applied stimulation may be time varying in the form of sinusoidal waves having a frequency of, e.g., 0 to 10,000 Hz. Additionally, the stimulation may be adapted and arranged to allow for the combination of sinusoidal waves to produce complex, time-varying waveforms that may mimic the activity and variability of a working brain.

The electrical stimulation may be applied at the treatment level for a specified period of time over the treatment period which may range anywhere from, e.g., 0.1 mins to 60 mins, in 0.1 min increments. The treatment level may also range anywhere from, e.g., 0.1 mA to 4 mA, where the treatment level may be varied in, e.g., 0.1 mA increments. The length and intensity of the treatment may be controlled through the controller.

The practitioner may program the controller with the various treatment parameters or they may be pre-set or controllable in real time via a remotely located controller. In the event that the controller is controlled remotely, communication to the controller may be maintained through various wireless or wired modalities.

The controller may optionally include a user interface which allows for the practitioner and/or patient to interface with the controller to enable the entry and/or display of various treatment parameters or the interface may simply comprise simplified external controls, e.g., controls which turn the treatment device on/off or pauses the treatment.

In the event the treatment system incorporates a pause mode to allow the practitioner or user to temporarily pause a treatment session, stimulation may be resumed after the pause. The controller may be programmed to time out further treatment after a specified period of time to prevent usage of the device beyond limits of frequency, amplitude, latency, or locations that are considered safe or effective.

After the treatment period, the stimulation may be reduced over a ramp down period until the initial current level has been reached or until the system has shut off. Like the ramp up period, the stimulation may be reduced over the ramp down period which may range anywhere from, e.g., 10 secs to 15 mins, during which the current may be decreased at intervals of, e.g., 1 sec. The controller may be optionally programmed to prevent the sudden starting or stopping of a treatment as a safety measure and to also ensure that the ramp up period and ramp down period are sufficiently timed and stepped in intensity.

The controller may be optionally further programmed to lock-out any further treatment once a treatment session has been completed for a specified period of time, e.g., 2 hrs to 36 hrs or more. This feature can be adapted and arranged in a number of different ways to limit use of the device to safe and effective treatment intervals.

Additionally and/or optionally, the controller may be further programmed to reverse the polarity of the electrodes along the electrode housing following a treatment session to prevent corrosion of the connections of the individual electrodes.

In determining the location for placing the electrode array upon the patient's head, c-TDCS generally involves utilizing only a general knowledge about the brain, the brain's cognitive functions, and the task at hand to target brain stimulation and is thus sub-optimal in locating and treating specific regions of the brain.

All challenges associated with c-TDCS may be overcome by utilizing neuroimaging-guided TDCS (ng-TDCS) which assumes no prior knowledge of the different brain areas, cognitive processes and the task at hand. Generally, application of the ng-TDCS for treatment of the subject may involve the steps of (1) recording the subject's brain activity at different states, (2) evaluating the differences between the different recorded states, (3) virtualizing the difference image between the recorded states and modeling the placement of electrodes for NIBS to visualize the currents for the purpose of optimally influencing the activity of the brain regions that are differentially activated in distinct brain states, and then (4) stimulating the subject's brain according to the modeled image.

The recording phase of ng-TDCS empirically determines the task-related brain regions or networks that should be targeted with ng-TDCS. The recording of task related brain activity can be supported with one or more neuroimaging modalities, e.g., magnetoencephalography (MEG), electroencephalography (EEG), functional magnetic resonance imaging (fMIRI), positron emission tomography (PET), single photon emission computed tomography (SPECT), electrocorticography (ECOG), structural magnetic resonance imaging (sMRI), diffusion tensor imaging (DTI), magnetic resonance spectroscopy (MRS), functional near infrared spectroscopy (fNIRS), etc.

The ng-TDCS technique takes advantage of the fact that there are desirable brain states that lead to behaviors that are well suited to the tasks and undesirable brain states that lead to poor performance on the same tasks. Desired brain states that aide performance could be attentive, happy, expert, quick, or well rested, while comparable undesirable brain states might be inattentive, sad, untrained, slow, injured, or sleep deprived. The ng-TDCS technique uses data from, e.g., MEG, EEG, fMRI, PET, SPECT, ECOG, fNIRS, sMRI, DTI, MRS, and other technologies to record data in the desirable and undesirable brain states, and in one embodiment, maps the recorded brain activity to the structures of origin using commonly available algorithms.

The localization of brain structures is done twice, once for desirable and again for undesirable brain states. This provides the basis for comparing and contrasting the structural and functional brain states that contribute to the difference between performance with desirable and undesirable outcomes. Thereby, determining the target brain region(s) where the influence of electrical ng-NIBS could move the user from an undesired to a desired brain state. The ng-NIBS approach differs from the standard practice of electrical NIBS where neuroimaging is rarely used to determine target brain structures. When no neuroimaging is performed the user must rely on often poorly founded assumptions about the electrical NIBS and the brain.

For evaluating the differences between brain states, the ng-NIBS technique calculates the target for electrical NIBS by comparing and contrasting MEG, EEG. fMRI, PET, SPECT, ECOG, fNIRS, sMRI, DT1, MRS, and other techniques from two different brain states. In one embodiment, the calculation could be made across individuals where a group of individuals with a desired brain state is compared to a group of individuals with an undesirable brain state; inattentive individuals could be compared to those who are attentive, expert individuals could be compared to novices, depressed individuals could be compared to healthy subjects, brain injured individuals could be compared to healthy individuals, individuals that perform a cognitive operation quickly could be compared to those who work more slowly. This is a "one size fits most" approach to the problem of optimizing NG-NIBS.

In yet another aspect, the present technology can employ various kinds of comparisons of various kinds of brain activities within the brain of each individual in order to determine the most advantageous locations or conformations of electrodes on the scalp. Multiple measures of brain activity in desirable and undesirable brain states are recorded in each individual, the sources are localized with standard algorithms, and the images of brain activity are subtracted to find the differences in brain activity within an individual, not a group as described above, that can be used to tailor an arrangement of scalp electrodes for optimal effectiveness in each individual. For example, no two strokes are alike, no two traumatic brain injuries are alike, and no two cases of insomnia are alike. Thus, customized arrangements of electrodes are necessary for each individual. Further, there are individual differences in the organization of healthy brains. Thus, the application of ng-NIBS can be further optimized for cognitive enhancement, sleep aide, pain relief, and other brain functions by customized application for each individual.

Additional information derived from recorded brain activity along one or more dimensions can be used to determine optimal ng-NIBS parameters for treatment of insomnia or sleep disorders, disease, such as cognitive enhancement. The parameters that can be used to determine ng-NIBS type include, but are not limited to, the location, amplitude, timing, phase, frequency, and duration of one or more activations in one or more brain areas.

The recorded brain activity is used not only to understand the characteristics of brain activity at specific brain regions but also to give information about the consistency or causation of amplitude relationships, time relationships, phase relationships, frequency relationships, and the duration relationships among and across multiple brain regions in response to events in the environment that are processed by the brain.

However, the application of the ng-NIBS method to determine the optimal brain targets for electrical NIBS is both innovative and extremely useful. The ng-NIBS approach allows both functional (e.g., MEG, EEG, fMRI, tNIRS, PET, SPECT, ECOG, and MRS) and structural (e.g., sMRI, DTI) comparisons between and within subjects. Previous studies have shown that one type of electrical ng-NIBS alters both structural (DTI) by reducing radial diffusivity in white matter tracts on the stimulated side of the brain and functional activity in terms of neurotransmitter turnover (MRS) as well as local and network level brain activity (MEG, EEG).

The difference image that will identify targets for stimulation within the brain can be derived by first determining the location of electrical activity (MEG, EEG, fMRI, tNIRS, SPECT, PET, ECOG), chemical concentrations (MRS), and structures (sMRI, DTI) in the brain during desirable and undesirable brain states. Second, the brain scans for desirable and undesirable brain states are coregistered for comparing similar spatial locations in the brain. Finally, the coregistered images of brain activity, chemistry, and/or structure, in desirable and undesirable brain states are subtracted. The difference image reveals the locations of brain activity that differ functionally, chemically, or structurally between desirable and undesirable brain states.

The difference image identifies regions of the brain that differ between desirable and undesirable brain states that may become targets for stimulation with electrical NIBS. Finite element modeling of a generic head or the head of an individual subject may be used to place electrical NIBS electrodes onto the head virtually using finite element modeling (FEM). The electrodes described herein can be placed on the virtual head using FEM and can be moved to see locations in the brain that are likely to be in the current path for electrical NIBS. The position of the electrodes described herein may be placed at locations on the scalp surface as to produce maximal current density in brain regions as indicated by FEM and identified as the target for stimulation by the difference image(s) in order to specifically task- or brain state related brain activity.

In some implementations a single electrode polarity may be placed on the scalp at difference image suggested scalp location(s), e.g., either anode to enhance brain activity or cathode to suppress brain activity. The other electrode may be placed on another portion of the subject's body, e.g., the upper arm, to eliminate problems caused by the placement of both anode and cathode on the scalp. This single scalp electrode approach straightforwardly enhances or suppresses brain activity without the complicating effects of simultaneous excitation and inhibition on different areas of brain. This ng-TDCS treatment can increase learning performance by 100% rather than the 10%-20% commonly observed in c-TDCS experiments.

In another embodiment, neuroimaging methods compare brain states within individuals across time, i.e. the brain states associated with correct responses could be compared to those recorded during incorrect responses, attentive could be compared to inattentive, novice could be compared to expert, tired could be compared to wide awake. The comparison of desirable and undesirable brain state within an individual could be used to develop customized electrode arrangements for electrical NIBS in each individual.

The idea of comparing and contrasting brain activity in two conditions or across two populations is conventional. However, the use of advanced neuroimaging-guided ("ng") techniques to quantify differences between groups of people, including diseased and healthy populations, or within individuals across time in combination with finite element modeling (FEM) and individually configurable electrode arrays to empirically guide electrical NIBS interventions is quite novel. This electrical NIBS that evaluates the differences between desired and undesired brain states has been used successfully to double the rate of learning in multiple laboratories and on multiple tasks.

According to the many and various embodiments of the present technology, the present disclosure provides, inter alia, various devices, methods, networks and systems for providing therapeutic and/or beneficial cranial electrostimulation. Accordingly, the present disclosure provides methods, systems, software and apparatus that utilize a combination of real time brain functional monitoring and non-invasive electrical and/or magnetic trans-cranial brain stimulation ("NIBS") to modify the brain function as exhibited in individual and group activities.

The present technology includes several methods and devices whereby neurological interventions are effected essentially by electrical NIBS-based procedures accomplished by the devices and methods described herein. These methods and devices are provided to be directed toward specific disorders and treatments, such as improving sleep. In one aspect, these devices and methods are adapted and arranged to be used on one or a plurality of subject brains for various purposes, affects and results. For instance, the devices and methods described herein provide methods for obtaining more accurate and dependable interventions based on information that can be gathered from the brains of subjects and for directing learning processes and functions in the brain and treating the patients accordingly.

One method for applying electrical NIBS is by utilizing Transcranial Direct Current Stimulation (TDCS) which generally delivers a weak constant current to the brain via electrodes that are affixed to the scalp of a subject. Electrical NIBS can also take the form of alternating current, randomly varying currents, temporally patterned currents, or combinations of the aforementioned. Electrical NIBS may be applied for various lengths of time (typically 10-60 minutes) to temporarily alter brain function. Electrical NIBS can alter the functions of one or more areas of the brain that are primarily dependent on the location of the electrodes placed upon the subject or patient's scalp.

Conventional TDCS (c-TDCS) units are large, boxy, table-top devices which are provided with multiple external controls and are suitable for laboratory use but problematic for the dissemination and use of the technology to greater numbers of people. In one aspect, the TDCS systems described herein may comprise a small, portable, programmable TDCS unit that may be adapted and arranged to provide one or more programmable functions. Various aspects of the systems are designed to enhance the safety and usability of the product by many people.

Figure 1B:
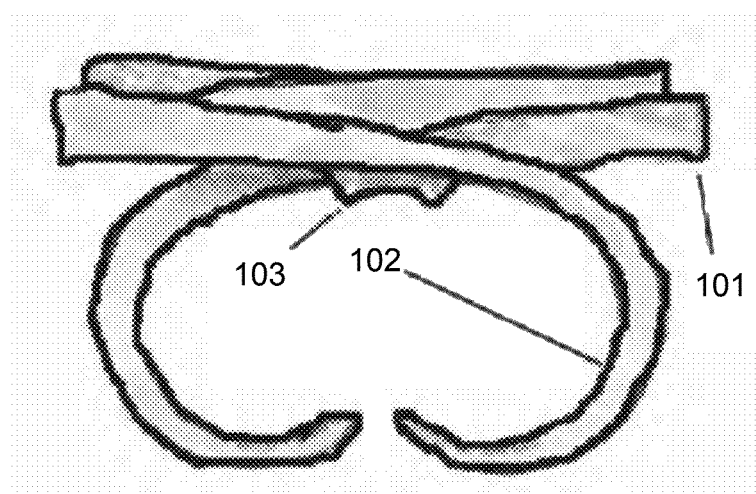

The application of TDCS may be used to change (e.g., for a short period of time) the way the brain of a subject works. TDCS applied to the head of a subject accomplishes this by delivering a very weak electrical current through the scalp and into the brain. One method for applying the TDCS may include securing one or more electrodes to the scalp by a number of different modalities. For instance, FIGS. 1A and 1B show perspective and end views of one variation of headgear 101 which can be used to facilitate placement of the one or more electrodes relative to the patient's head. The headgear 101 shown may be configured to be worn upon the patient's head like a pair of glasses where the headgear 101 may have a frame supported by two stabilizing ear loops 102 and a nose bridge 103. Once folded, the headgear 101 may be configured for compact storage, as shown in FIG. 1B, where the ear loops 102 may be folded relative to the nose bridge 103.

Figure 2A:
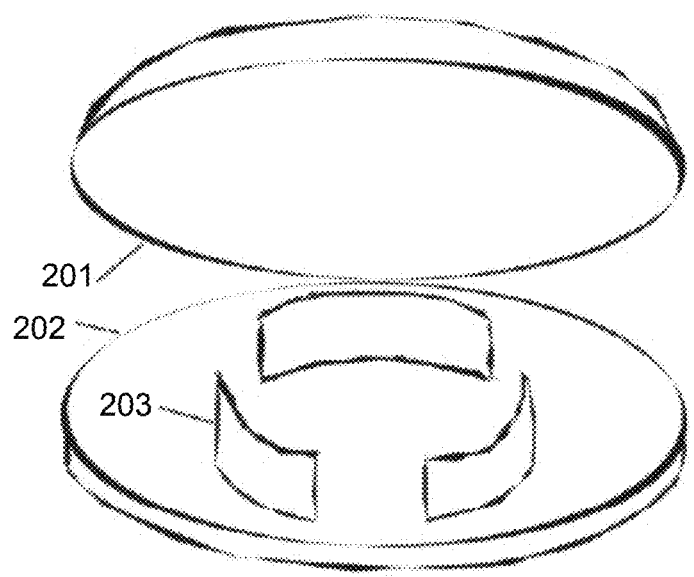
FIG. 2A illustrates a perspective view of an optional storage housing having a top lid and bottom lid in accordance with one embodiment.
Figure 2B:
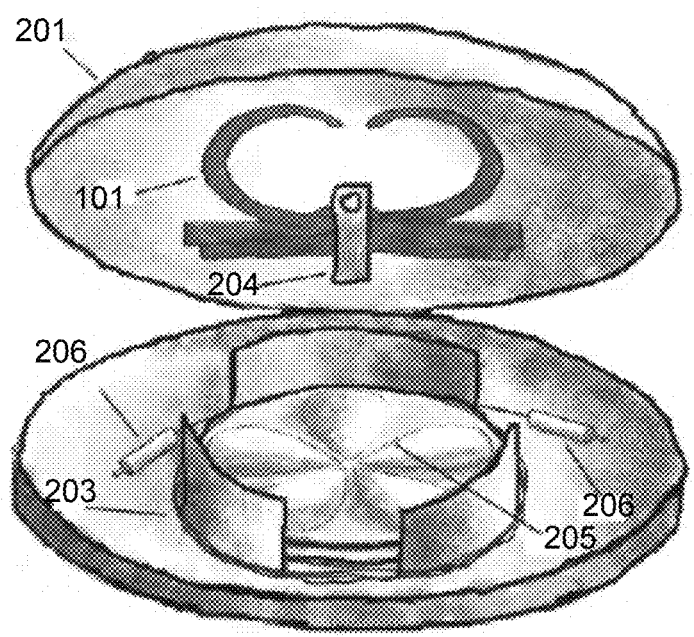
FIG. 2B illustrates a perspective view of various components of the TDCS system positioned within the storage housing.

FIG. 2A illustrates a perspective view of an optional storage housing having a top lid 201 and bottom lid 202 with features or projections 203 which define a receiving channel or region for holding various components of the TDCS system, e.g., headgear, electrode assembly, electronics, power supply, etc. FIG. 2B illustrates a perspective view of various components of the TDCS system positioned within the storage housing. For instance, the headgear 101 may be folded and secured via a strap 204 upon the top lid 201 while an electrode assembly 205 having interface plugs 206 may be stored within the feature 203.

Figure 3A:
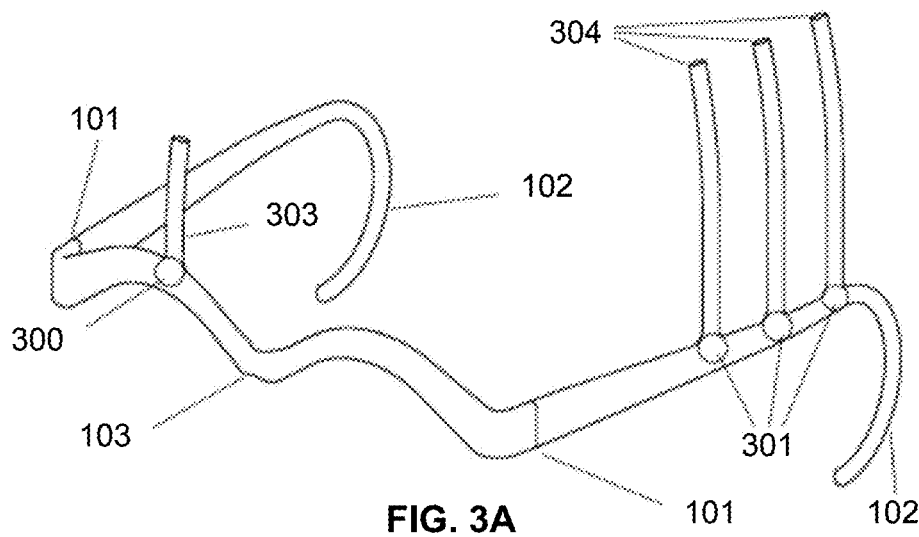
FIGS. 3A and 3C show perspective and end views of another variation of headgear which is configured to facilitate the positioning of the one or more electrodes relative to the patient's head.
Figure 3B:
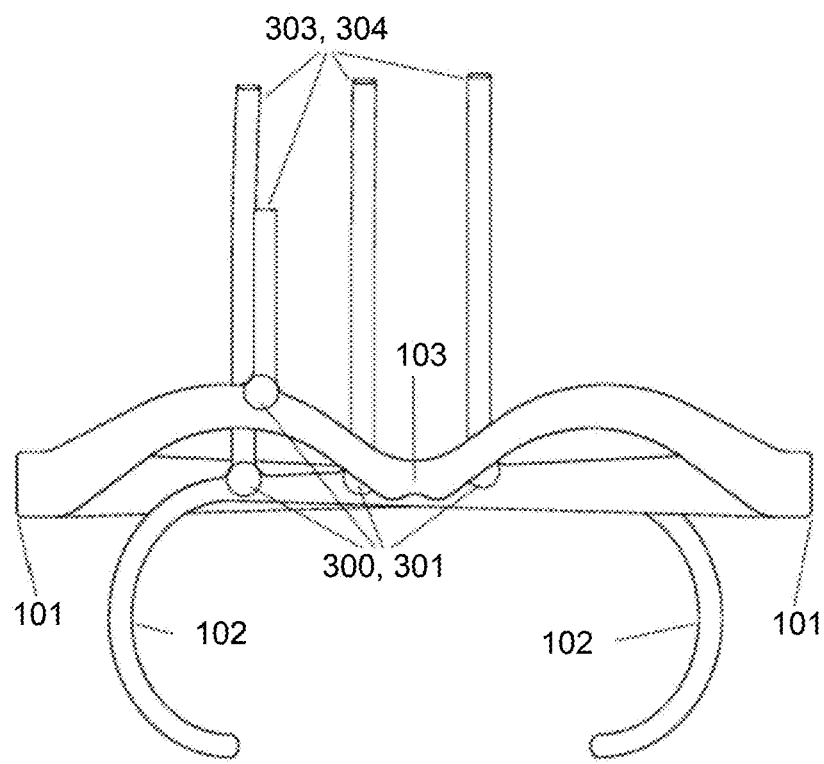

FIGS. 3A and 3B show perspective and end views of another variation of headgear which is configured to facilitate the positioning of the one or more electrodes relative to the patient's head. This variation may include headgear 101 frame supported by two stabilizing ear loops 102 and a nose bridge 103, as previously described. Additionally, this variation may further incorporate one or more hinged joints 300, 301 which connect to corresponding stanchions 303, 304 which may extend from the joints and away from the frame such that the stanchions 303, 304 are suitably positioned relative to the patient's head for holding electrode or electrode array against selected regions of the scalp. Each of the stanchions 303, 304 may be configured to be uniform in length or they may be varied depending on the region of the scalp where the electrode is to be positioned. Moreover, one or more of the stanchions 303, 304 may be adjustable in length to allow for variability of electrode positioning. Furthermore, one or more of the stanchions 303, 304 may be curved or angled to allow for additional variability in electrode positioning.

Figure 3C:
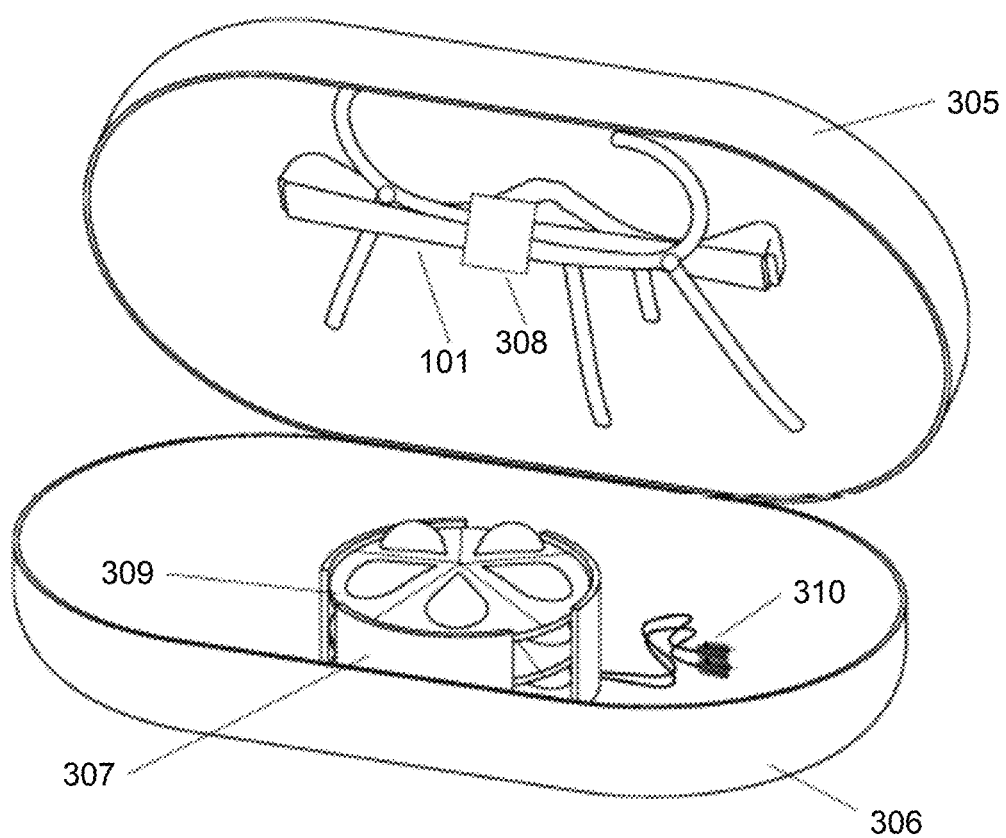

When the stanchions 303, 304 are not in use such as when the headgear is stored, the stanchions 303, 304 may be folded via the hinged joints 300, 301 to allow for the stanchions 303, 304 to be folded for storage. FIG. 3C shows a perspective view of another variation of the storage housing having a top lid 305 and bottom lid 306 with features or projections 307 which define a receiving channel or region for holding various components of the TDCS system, as similarly described above. This variation illustrates an example of the headgear of FIG. 3B secured to the top lid 305 via a strap 308 and the electrode assembly 309 with interface plugs 310 stored within the receiving channel or region of the bottom lid 306.

Figure 4A:
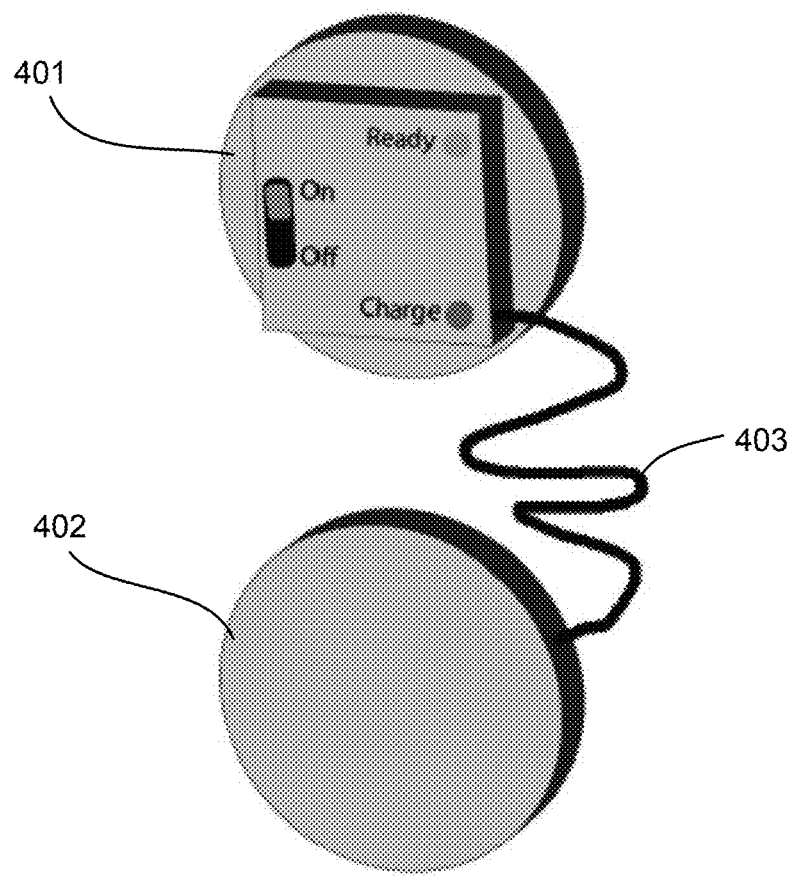
FIG. 4A shows a perspective assembly view of some of the various components of the magnetic stimulation delivery system which may be incorporated into the TDCS system.

FIG. 4A shows a perspective assembly view of some of the various components of the magnetic stimulation delivery system which may be incorporated into the TDCS system. A controller 401 may have a user interface for setting various delivery stimulation parameters, power actuator, one or more various indicators or alarms for alerting the user, etc. One or more wires or cables 403 may connect the controller 401 to the electrode housing 402 which may be secured to the patient's head.

The controller 401 may be powered by an external power supply or it may optionally incorporate an internal battery either within the controller 401 or separately attached. The controller 401 may thus be programmed to monitor the battery charge level to ensure that the device is capable of completing the treatment stimulation at the same charge level. One or more alerts or alarms may be included in the controller 401 to provide an indication of charge level or the information may be provided on a user interface.

Figure 4B:
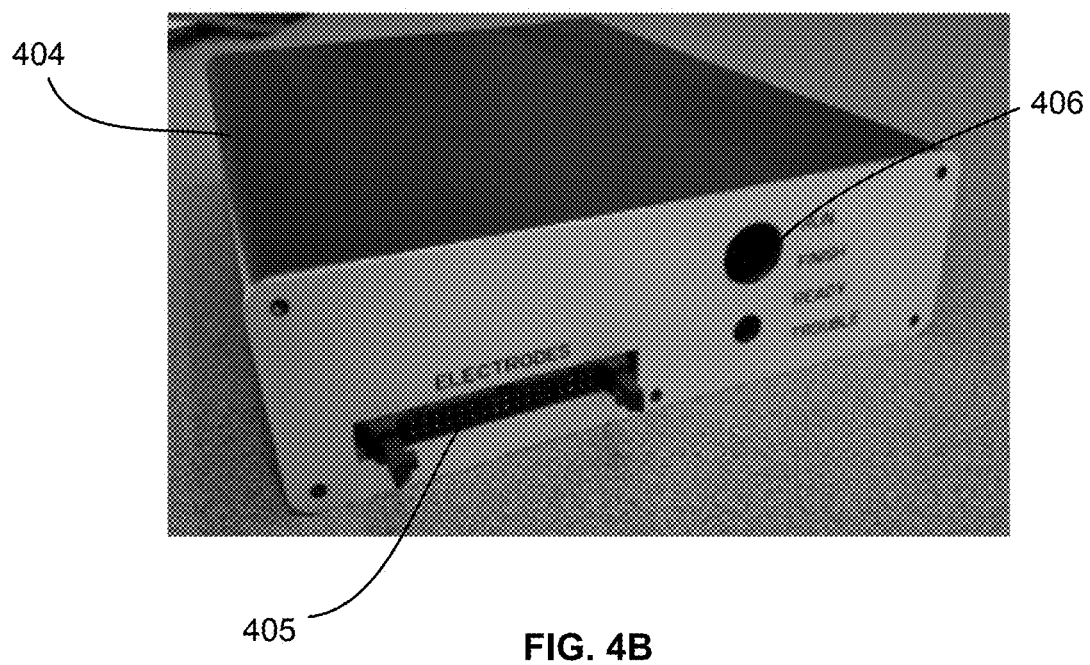
FIG. 4B shows another variation of a controller in accordance with one embodiment.

Another variation of the controller 404 is illustrated in the perspective view of FIG. 4B. The housing of the controller 404 may contain the electronics and processor as well as power supply. The electrode assembly may be coupled to the controller 404 via a connector 405 and one or more control inputs 406 may also be incorporated into the controller 404.

Figures 5A, 5B:
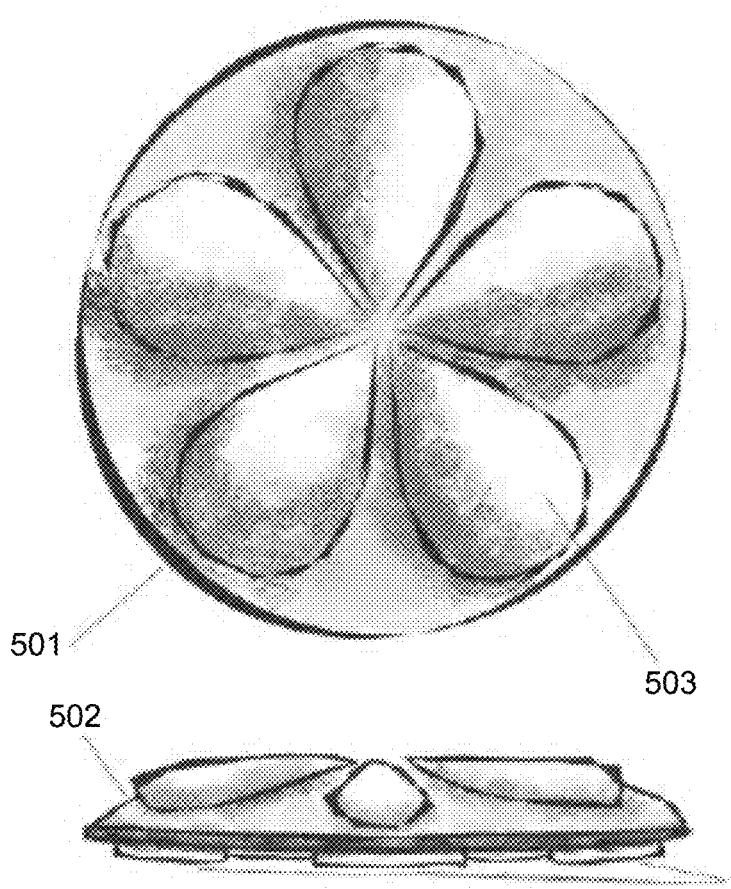
FIGS. 5A and 5B show one variation of an electrode housing assembly.

One variation of the electrode housing assembly 501 may be seen in the top and side views shown respectively in FIGS. 5A and 5B. In this variation, the electrode housing 501 may have one or more individual electrodes 503 arranged in various configurations within the housing body 502 for stimulating the underlying brain region through the patient's scalp. To facilitate the electrical communication from the electrodes to the brain, the electrodes may be housed within or surrounded by an individual cavity or channel designed to hold a medium such as electrically conductive gel (e.g., a pH buffered electrode gel) for facilitating the electrical transmission.

Figure 6A:
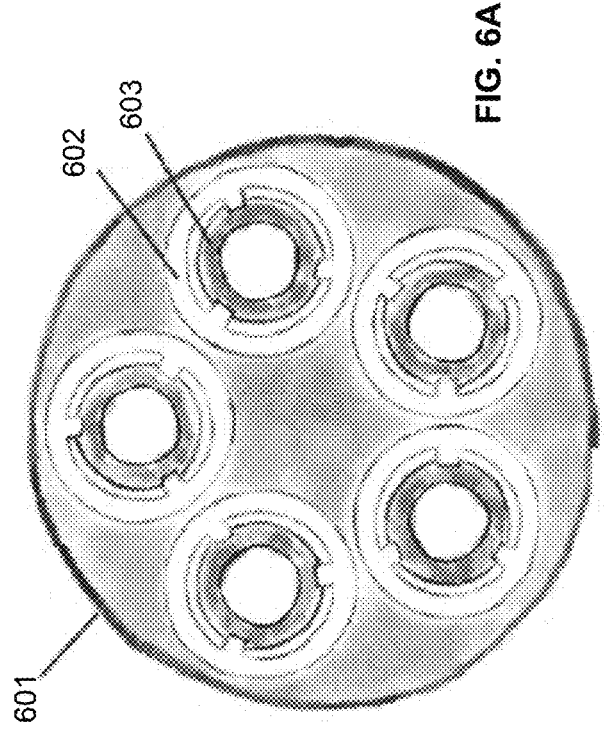
FIGS. 6A to 6C shows variations of an electrode housing having a bottom surface over which the individual electrodes may be arranged.

For instance, FIG. 6A shows a bottom view of the electrode housing 601 having a bottom surface over which the individual electrodes 603 may be arranged. The electrodes shown are configured in circular shapes (e.g., toroid-shaped) arranged in a planar manner over the electrode housing 601; however, the electrodes 603 may be formed into other shapes. The electrode housing 601 may be fabricated from a variety of non-porous materials such as polymers or plastics. The toroid-shaped electrodes have shown stability over the treatment time period and they do not leak errant currents on the areas surrounding the skin-electrode interface. These electrodes also maximize the edge length to thereby reduce electrical NIBS-elicited sensations at the skin-electrode interface. Each of the electrodes 603 may have a non-conductive material 602 which is optionally pliable (e.g., rubber, silicone, etc.) surrounding each of the respective electrodes 603. As further illustrated in the respective top and bottom views of FIGS. 6B and 6C, each electrode 603 may be configured in a circular shape which defines an opening 604 through and which is electrically coupled to a respective wire 606.

With the electrodes positioned along the bottom surface, the non-conductive material 602 may surround the electrode 603 and extend from the bottom surface to form a cavity or channel 605 having a depth of about, e.g., 4 mm, which may be optionally filled with a sufficient volume of a conductive gel (e.g., a pH buffered electrode gel) or medium to facilitate transmission of the electrical stimulation into the underlying scalp. The opening 604 in the center of the electrode 603 and the air spaces around the electrodes 603 are desirable for access to the skin surface to ensure a low impedance interface between skin and electrode.

Figure 6C:
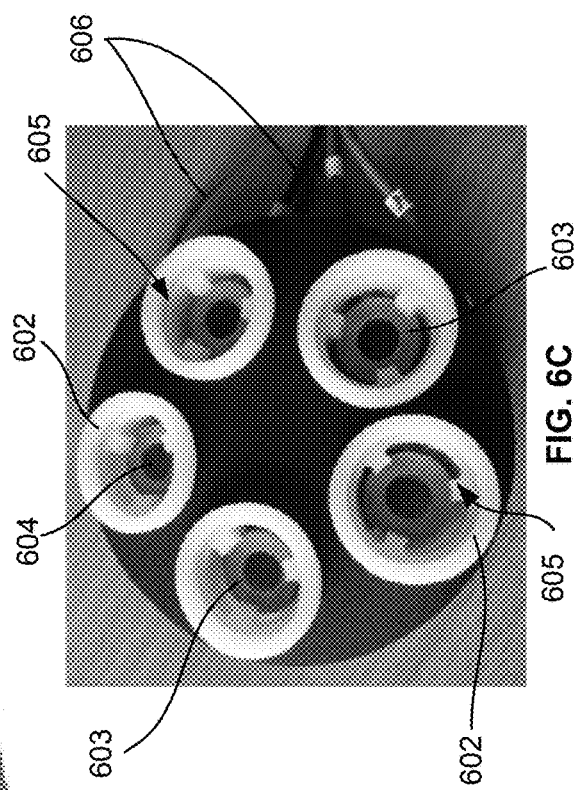
Figure 6B:
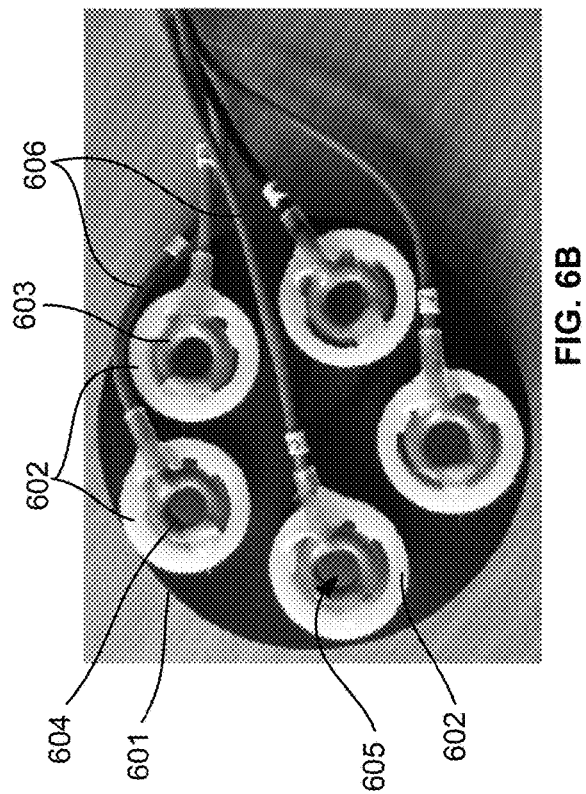

The variation shown in FIGS. 6B and 6C illustrate five electrodes 603 which are arranged in a uniform circular pattern over the electrode housing 601. However, other variations may have the electrodes 603 arranged in other patterns as needed. Moreover, the electrode housing 601 may be designed to be portable so that the housing has a dimension of, e.g., 1 cm×1 cm up to 4 cm×4 cm or greater, and a height of, e.g., up to 4 cm.

In use, the electrode housing 601 may be positioned anywhere upon the patient's scalp in proximity to the desired region for treatment, e.g., along the side of the patient's head over the frontal, parietal, temporal, etc. region so long as the electrical stimulation from the electrodes is transmitted through the scalp and into the targeted underlying region of the brain. The region of the brain for treatment may be located using the targeting methods as described in further detail herein. Additionally, the anodes and cathodes within the electrode housing 601 can be optionally varied or interchanged on the scalp to deliver varied combinations of anodal and cathodal current to the underlying brain depending on the electrode arrangement or pattern to enhance the ability of the treatment procedure to precisely target specific structures within the brain.

Figure 7A:
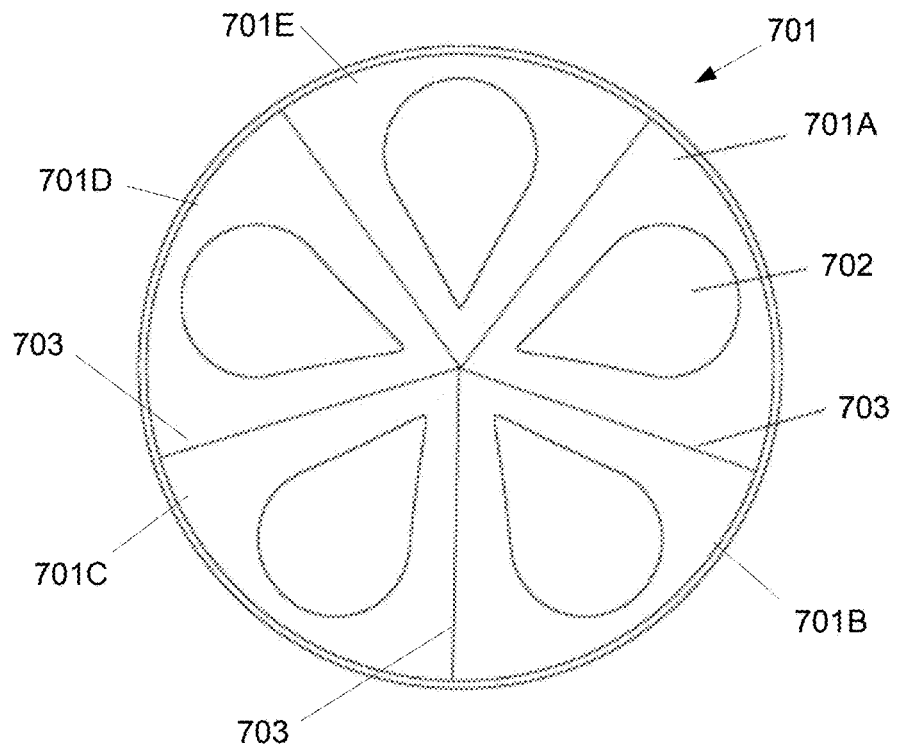
FIGS. 7A to 7G show alternative variations of an electrode housing formed by several individual electrode components.
Figure 7B:
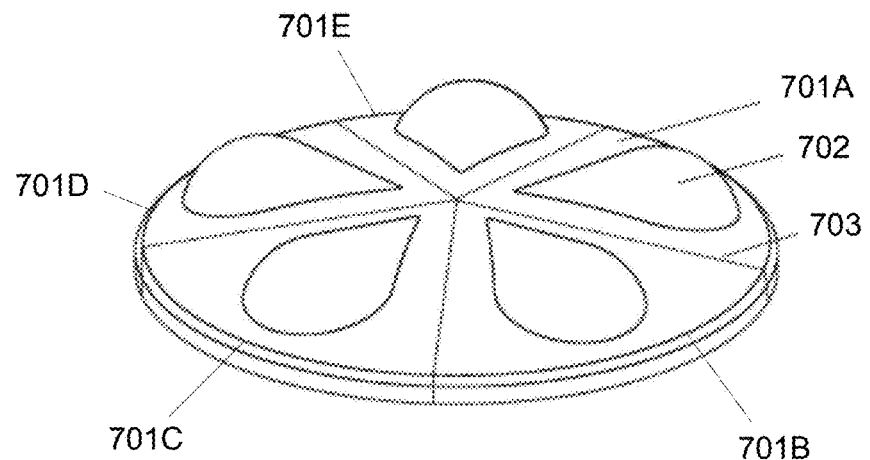
Figure 7C:
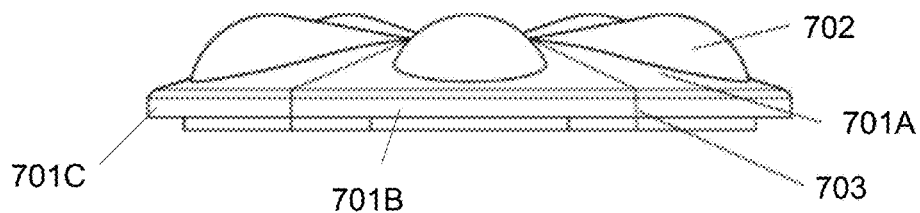

Another variation of the electrode housing is shown in the top, perspective, and side views of FIGS. 7A to 7C which illustrate an electrode housing 701 which is formed by several individual electrode components 701A to 701E which are attachable to one another in various configurations. In the variation shown, each of the electrode components 701A to 701E may have a corresponding electrode 702 and the electrode component may be formed to have uniform circular sector shape which collectively together form a circular electrode housing 701. The electrode components may be attachable to an adjacent electrode component along a component interface 703 via any number of securement mechanisms. Accordingly, the electrode housing 701 with each of the electrode components 701A to 701E may be used as an electrode assembly when positioned in proximity to the scalp.

Figure 7D:
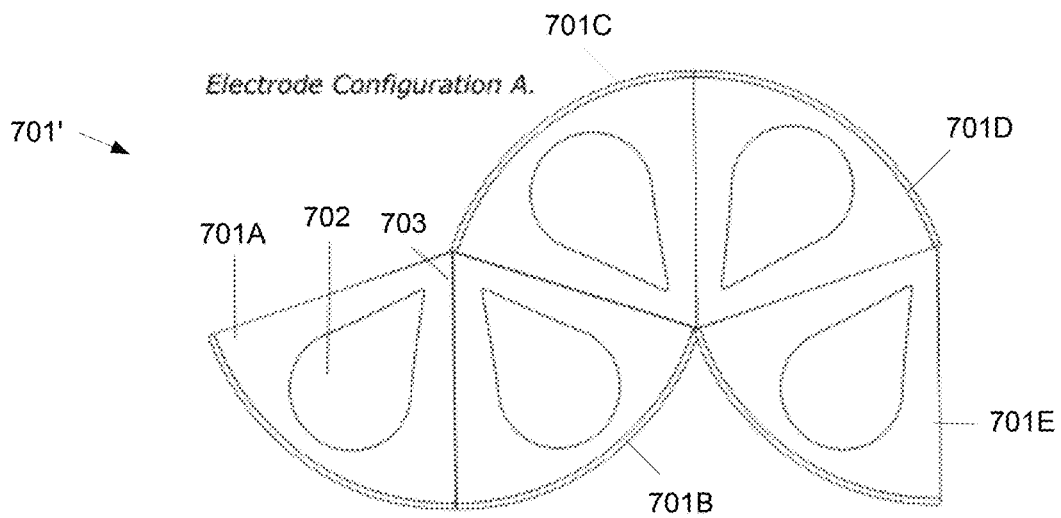
Figure 7E:
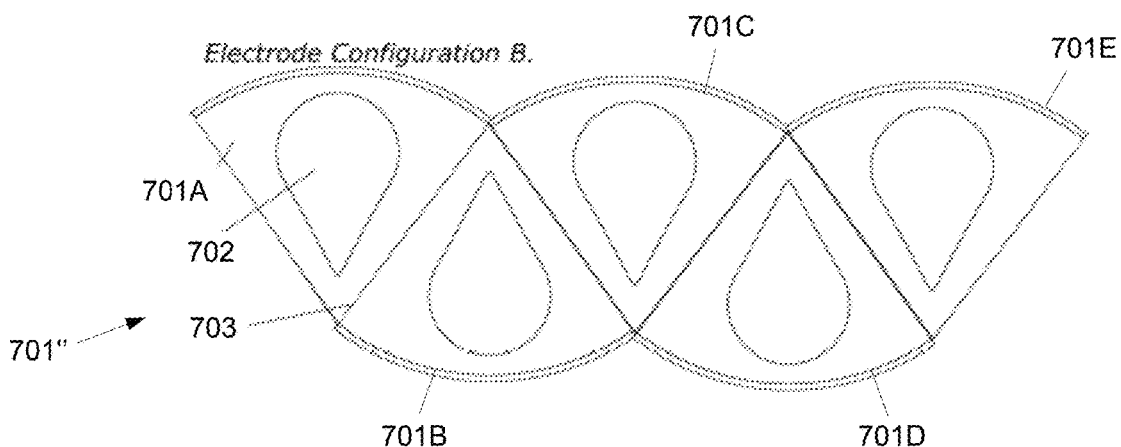
Figure 7F:
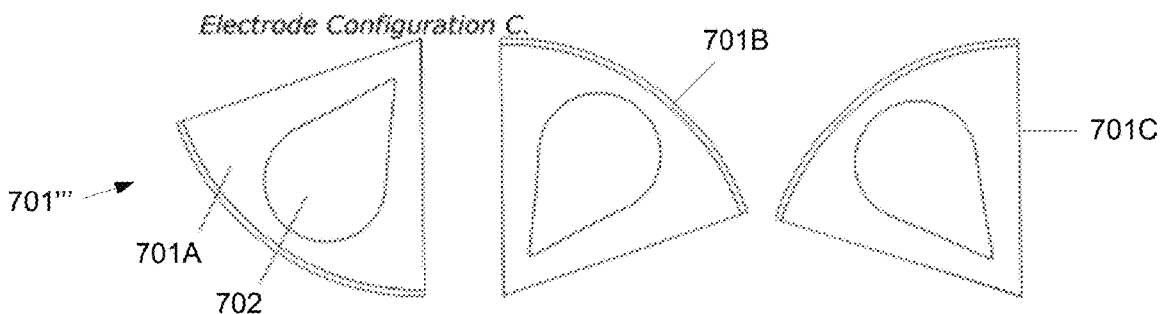

Alternatively, one or more portions of the electrode components 701A to 701E may be separated and rearranged relative to one another to form different configurations for positioning in proximity to the scalp for treatment. FIG. 7D shows a top view of one alternative arrangement 701' in which components 701C, 701D, 701E may be attached to component 701B in a reversed configuration. FIG. 7E shows another variation 701" where each of the electrode components may be attached to an adjacent component in an alternating pattern and FIG. 7F shows yet another variation 701''' where individual components may be separated and used individually. These variations are intended to be illustrative of potential arrangements and other variations are intended to be included within the scope of this description.

Figure 7G:
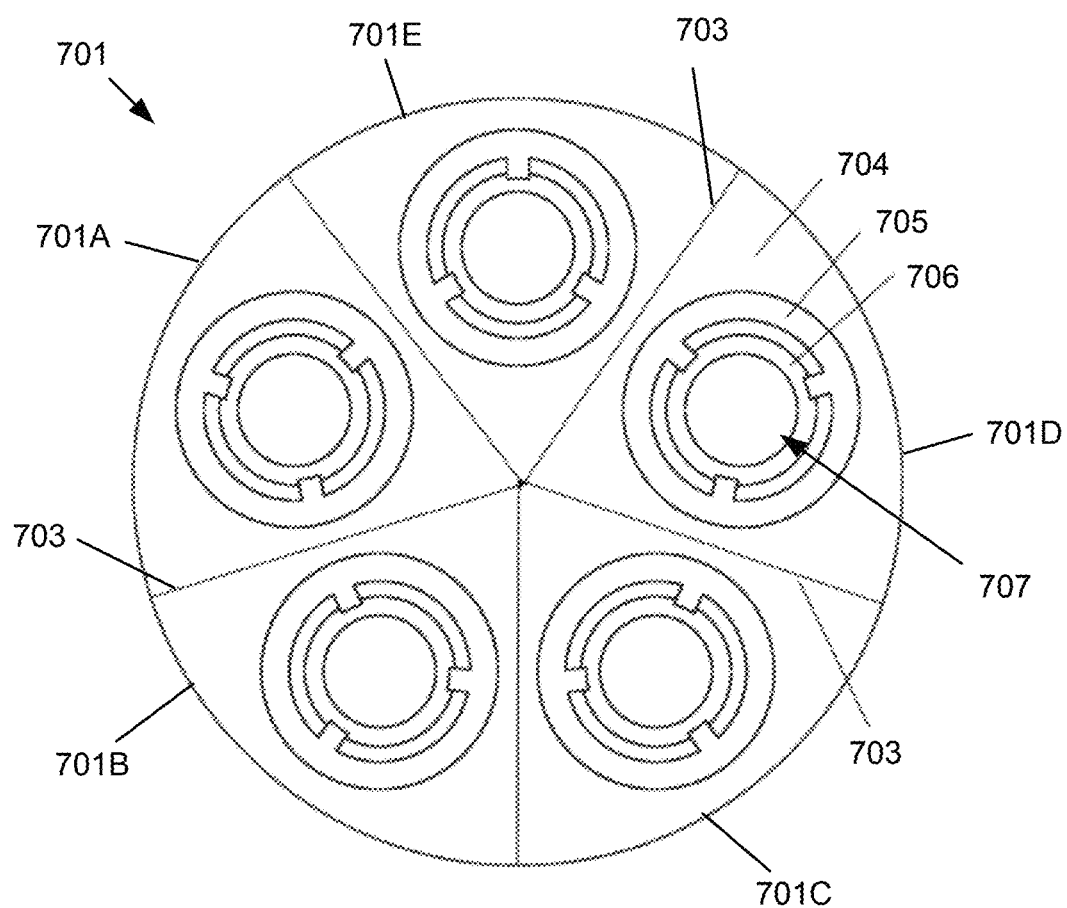

FIG. 7G shows a bottom view of the electrode housing 701 when formed in a circular configuration and having a bottom interface surface 704 over which the individual electrodes 706 may be arranged. The electrodes 706 shown are configured in circular shapes (e.g., toroid-shaped) arranged in a planar manner with a non-conductive material 705 surrounding the electrode 706 and extending from the bottom surface to form a cavity or channel 707.

The designing and configuring of the individual electrodes and arrays of electrodes can be accomplished by applying finite element modeling (FEM) to data gathered regarding the brain, scalp, skull and associated tissues. In this aspect, the finite element model can be adapted and arranged to function as a guide with respect to the influence of the electrical NIBS on one or more portions, regions or areas of one or more target brain regions. With the gathered data, and with the assistance of finite element analysis, the relative configuration(s) and design(s) of the electrodes and electrode arrays can be effected with respect to various brain tissues in terms of, for example, the spatial distribution, polarity, and intensity of the excitation or inhibition delivered via NIBS. The combination of these systems, methods, devices, components and elements of the present technology are directed toward an efficient and effective step or activity of stimulating one or more target brains with electrical NIBS. As another advantage, one or more of the polarity, intensity, and spatial distribution of stimulation can be programmed into the devices and arrays described herein to produce maximal influence (excitation or inhibition) at the target sites.

Figure 8A:
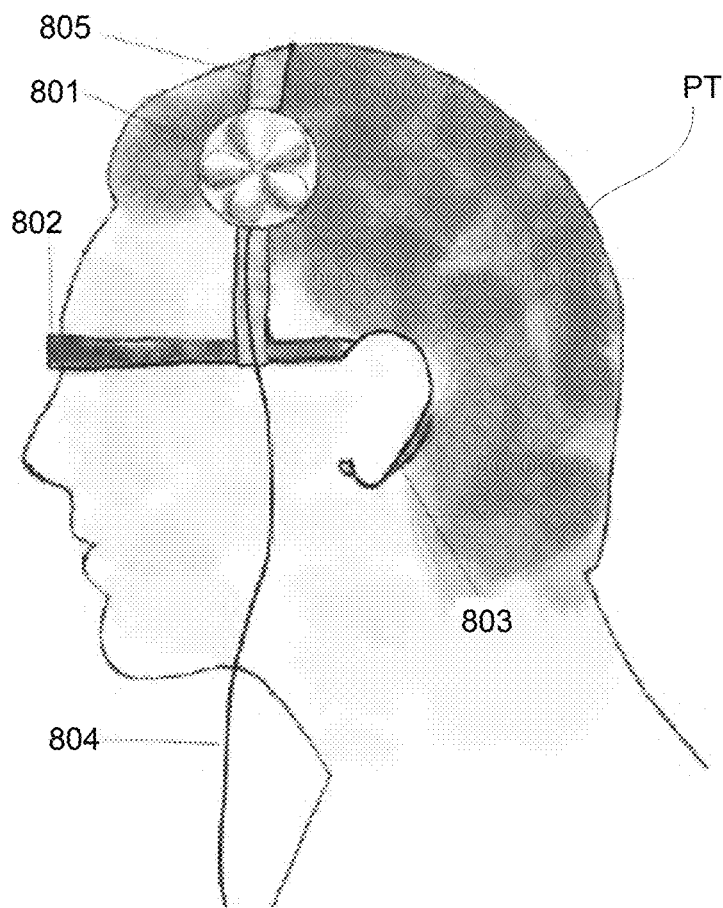
FIG. 8A shows an electrode housing positioned against the patient's head.

Once the targeted region of the brain has been located, the electrode housing 801 may be positioned against the patient's head PT, e.g., over the frontal or parietal region as shown in the side view of FIG. 8A, and each of the electrodes may be filled with the conductive gel (e.g., a pH buffered electrode gel) or medium to facilitate electrical transmission. The electrode housing 801 may be secured in place against the patient's head through various mechanisms, e.g., the headgear 802 shown secured to the patient's head via the loops 803 and optional band 805. The electrode housing 801 may be seen with the electrical wires or cables 804 coupled to the housing 801 and to a controller.

Optionally, the electrode housing 801 may incorporate a pressure activated switch which requires the user or practitioner to affirmatively press the electrode housing 801 against the patient's scalp. Once the pressure switch is activated, the controller 501 may be programmed to automatically begin the intervention or treatment stimulation.

Figure 8B:
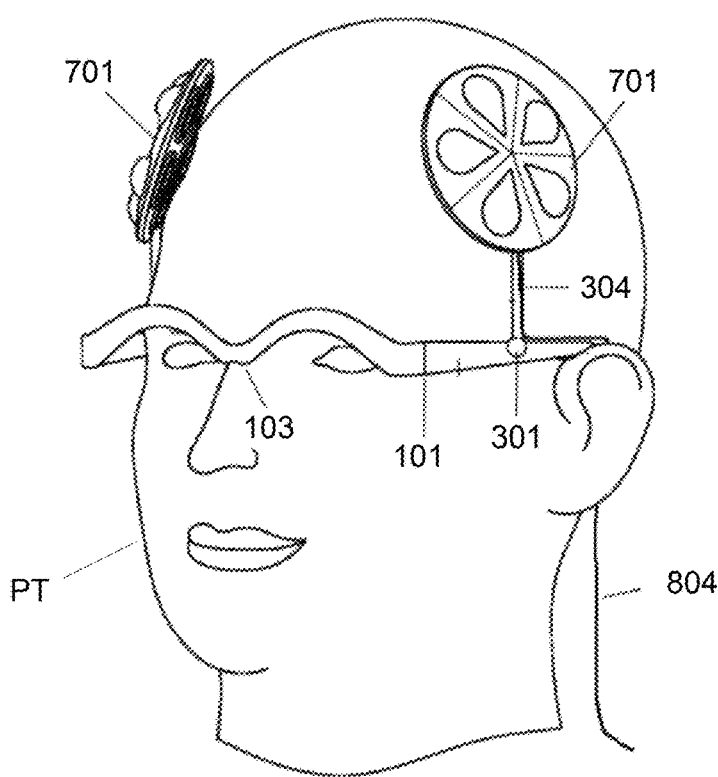
FIG. 8B shows a perspective view of the patient with headgear with the one or more stanchions extending from the frame.

FIG. 8B shows a perspective view of the patient PT with headgear 101 with the one or more stanchions 304 extending from the frame. In this example, the electrode housings 701 in its circular configuration are attached to the end of stanchions 304 for positioning relative to the patient's scalp. In other variations, the electrode housing 701 may be rearranged and/or separated, as described above, and secured to one or more stanchions 304 as desired for positioning over various regions of the scalp.

Figure 9A:
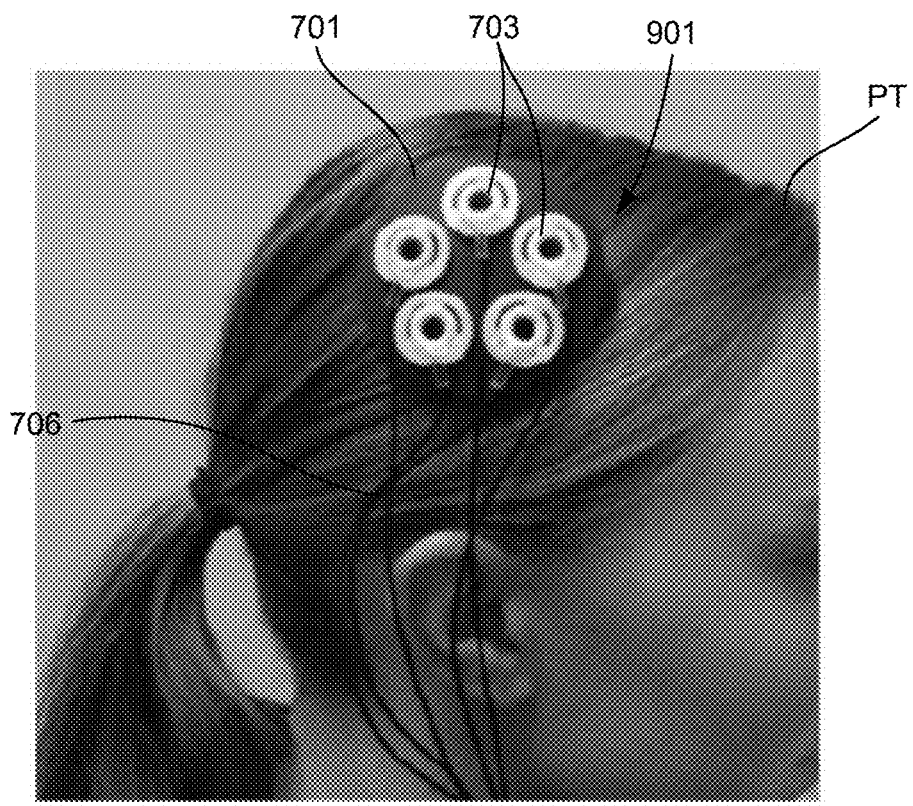
FIG. 9A shows another side view of another variation of the electrode housing positioned upon the patient's scalp at a treatment location over the frontal or parietal region.

FIG. 9A shows another side view of another variation of the electrode housing 701 positioned upon the patient's PT scalp at a treatment location 901, e.g., over the frontal or parietal region (depending upon the region of the brain to be stimulated). The electrodes 703 may be seen arranged upon the electrode housing 701 in a uniform circular pattern (e.g., five-electrode array) with each electrode 703 being surrounded by the corresponding non-conductive material 702. Such an arrangement may be suitable for delivering the stimulation to a focal area of the brain. The cavity or channel 705 formed around each electrode 703 may be optionally filled with a conductive gel or medium, as described herein, to facilitate electrical contact with the underlying scalp for transmission of the stimulation signals into the brain regions below.

Figure 9B:
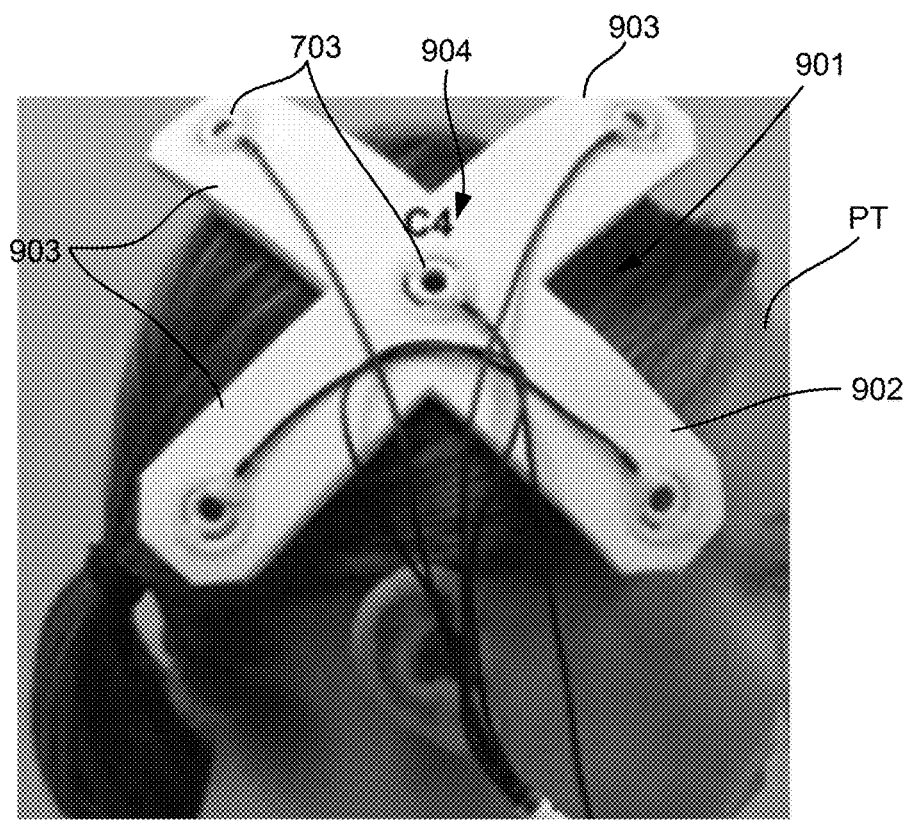
FIG. 9B shows another variation of an electrode assembly which is formed into a cross or X-shaped pattern.

FIG. 9B shows another variation of an electrode assembly 902 which is formed into a cross or X-shaped pattern (e.g., five-electrode array). While the electrode pattern shown in FIG. 9A was arranged in a compact pattern where each electrode 703 was positioned adjacent to one another in a circular arrangement, the arm members 903 of the electrode assembly 902 shown in FIG. 9B has its arm extending from a common intersection 904 such that the intersection 904 is centered over the treatment location 901 and the arm members 903, shown in this example as four arms extending perpendicularly relative to on another, extend over different regions of the patient's head so as to position their respective electrodes 703 at corresponding different regions of the brain. An electrode 703 may be positioned near or at the terminal end of each arm member 903 as well as near or at the intersection 904 and each of the electrodes 703 may be configured to incorporate the non-conductive material 702 for forming the cavity or channel, as previously described. The electrode assembly 902 may be secured against the patient's scalp using any of the methods described and while the arm members 903 are shown to have a uniform length, one or all of the arm members 903 may be varied in length depending upon the region of the brain to be stimulated. Such an arrangement may be suitable when delivering the stimulation over a relatively wider area of the brain rather than a focal area.

In addition to the electrode assembly secured to the patient's scalp, an additional electrode may be secured to a portion of the arm, chest, back, or neck of the subject, e.g., along the upper arm. The electrode secured to the arm may also be in communication with the controller 501 as well.

Controller

Generally, the controller may be used to drive, e.g., 24 independent channels, where each channel provides an independent current source across an electrode pair where the voltage level is controlled by an arbitrary waveform that is input into the controller, e.g., read from flash memory or other storage. The stored treatment data may comprise at least one arbitrary waveform that determines a number of different treatment parameters, e.g., frequency, amplitude, latency, location, and duration of the stimulation. The start of any operation of the system may be based on an external trigger event and the maximum voltage levels as well as time duration for stimulation may be controlled prior the start of any stimulation. That is, the maximum voltage for each channel may be determined at the beginning of the stimulation based, at least in part, on a measured impedance value in each channel so as to inhibit or prevent a relatively high current from being delivered to the subject. Hence, the current and voltage across each electrode may be monitored individually and each channel may drive an arbitrary waveform independently of one another. Moreover, because the system allows for the controller to select either bi-polar or single-ended outputs, the selection of a bi-polar output enables the use of a floating ground which allows for any arbitrary channel to be grounded and thus allows for the delivery of any desired input waveform.

Furthermore, with respect to the trigger event, the controller may be configured to receive multiple trigger inputs for responses to neuroimaging or behavioral data individually or in combination with or without Boolean logical responses to brain and behavioral state of the subject. In particular, the multiple trigger inputs for responses may be with respect to brain or behavioral state of a collocated or remotely located individual.

Figure 10:
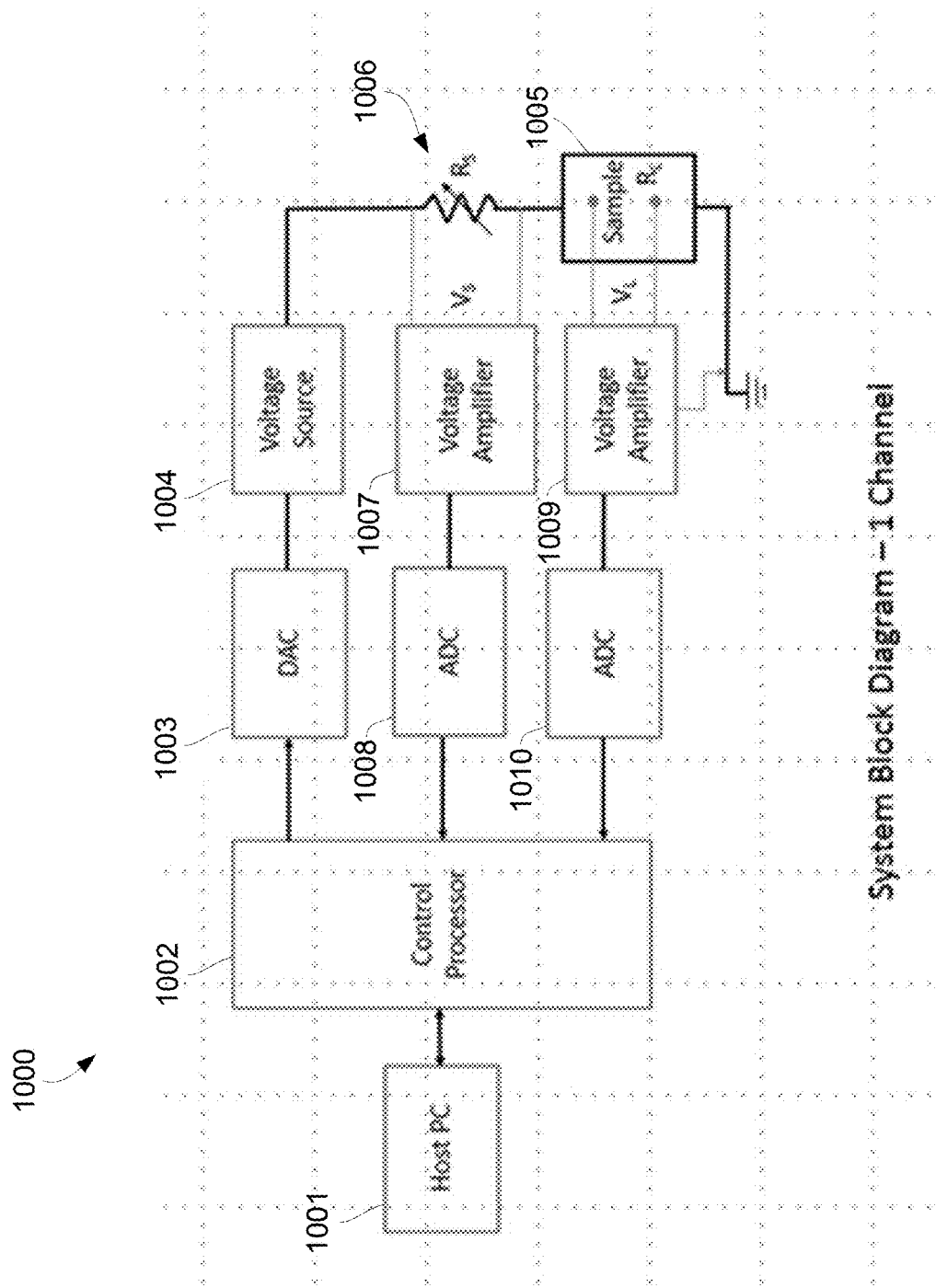
FIG. 10 is a system block diagram for a single channel.

As the current is driven across the electrodes the current, voltage, and an open circuit detect circuit may monitor the stimulation. A schematic system block diagram 1000 is shown for a single channel for illustrative purposes in FIG. 10. The controller may house the electronics for each of the channels including the control processor 1002, which may interface with a host computer 1001 (or other device). New stimulation waveforms, log files, system control and setup, etc. may be input or otherwise performed by the computer 1001 which interfaces with the control processor 1002.

For each channel, the control processor 1002 may send the data to a digital-to-analog converter (DAC) 1003 to control the output from the voltage source 1004 to the corresponding electrode pair 1005 when positioned into proximity with the target. A potentiometer or variable resistor 1006 may be electrically coupled with a voltage amplifier 1007 which in turn is electrically coupled to the processor 1002 via an analog-to-digital converter (ADC) 1008 to provide feedback to the processor 1002. An open circuit detection circuit may be in communication with the processor 1002 from the electrode pair 1005 and via a voltage amplifier 1009 and an analog-to-digital converter (ADC) 1010, as shown, for determining whether an open circuit is present. The current read by the ADC across each electrode may be, e.g., 1 mA, while the voltage across each electrode may be, e.g., 10 V. The impedance value across each electrode may be calculated by the RMS of resistances over a 1 second interval:

$$V_{rms} = \sqrt{\frac{\sum_{n=1}^{w}(V_n)^2}{w}} \quad (1)$$

where w equals the 1 second window.

The controller may output a maximum of, e.g., 80V (+/−40V), which may be adjusted by the software to maintain a current over an electrode-to-scalp connection impedance range from, e.g., 4 to 40,000 Ohms. For this reason, a current source is desirable where a frequency range for DC may range up to 10 kHz. The impedance of the system may be monitored and checked automatically by the controller, e.g., once per minute, and the mean impedance may be calculated across the entire electrode array. Additionally, the impedance values may be monitored and measured for each channel independently of one another. Because of the possible hardware and software combination, the current and voltage specifications on individual channels do not need to sum to zero thus allowing current steering across a plurality of channels where the total current sums to zero.

With the electrodes desirably positioned upon the patient's head, the electrical stimulation may be applied in a ramped manner so that the current is not applied instantly but is applied at an increasing level over a specified period of time. In the event that the impedance is detected to exceed 40,000 Ohm, the controller 501 may be programmed to automatically ramp down the stimulation over a specified period of time, e.g., 10 secs. An alert or alarm may be activated and the device may be placed into a pause mode. Once treatment has been completed, the current may also be reduced at a decreasing level over a specified period of time. Ramping up and ramping down the current may help to avoid any damage to the patient's brain.

The electrode housing 701 may optionally incorporate one or more sensors and/or the controller 501 may be programmed to monitor the impedance after the electrode housing 701 has been applied to the patient's scalp. Before, during, and/or after treatment, the impedance may be monitored to detect for changes in the impedance value. For instance, if a high impedance is detected, the controller 501 may be programmed to provide an alert or alarm to the user or practitioner and the device may be automatically terminated. Furthermore, the current output may be maintained via a hardware control loop and also monitored via a software control loop.

Figure 11:
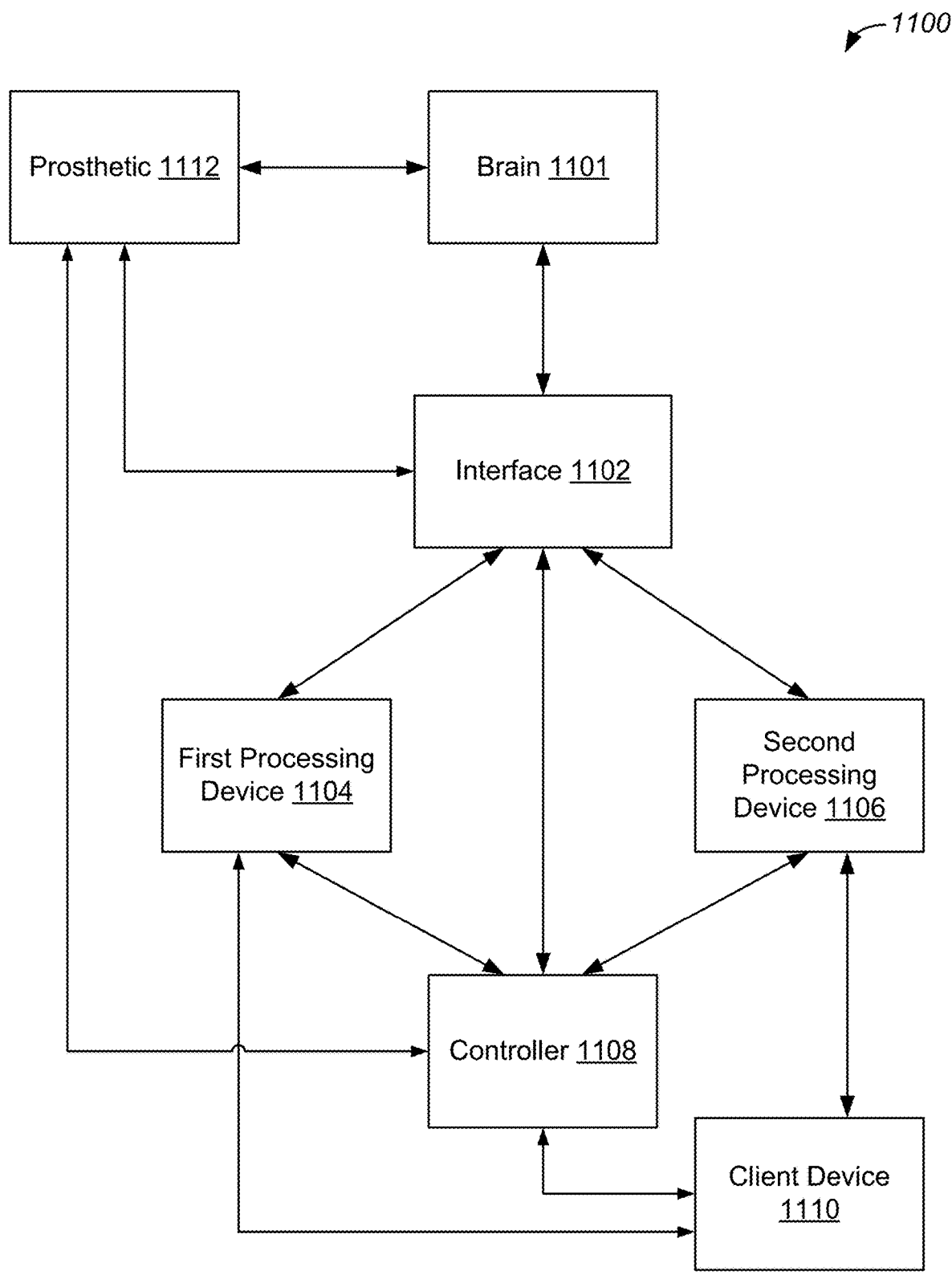
FIG. 11 illustrates an example of a system for providing closed loop control in treatments and cognitive enhancements, configured in accordance with some embodiments.

FIG. 11 shows a graph illustrating one example for applying the electrical stimulation to the patient where the initial current 1101, e.g., 0 mA, may be increased over a ramp up period 1103 until the treatment level 1102 (e.g., X mA) has been reached with an output constant current maximum of, e.g., 4 mA peak magnitude. The applied electrical stimulation may be applied so that the treatment level 1102 is reached over a predetermined period of time during the ramp up period 1103 so as to avoid any potential injury to the patient's tissue. For instance, the applied current may be increased over a period of, e.g., 10 secs to 15 mins, during the ramp up period 1103 where the current may be increased at intervals of, e.g., 1 sec. An example may include ramping the current up and/or down each over a 15 sec period although the ramp up and/or ramp down period may be adjustable.

The electrical stimulation parameters may be controlled by the controller 501 and the stimulation may be applied in a number of different modalities. For instance, the applied stimulation may be time varying in the form of sinusoidal waves having a frequency of, e.g., 0 to 10,000 Hz. Additionally, the stimulation may be adapted and arranged to allow for the combination of sinusoidal waves to produce complex, time-varying waveforms that may mimic the activity and variability of a working brain.

The electrical stimulation may be applied at the treatment level 1102 for a specified period of time over the treatment period 1104 which may range anywhere from, e.g., 0.1 mins to 60 mins, in 0.1 min increments. The treatment level 1102 may also range anywhere from, e.g., 0.1 mA to 4 mA, where the treatment level may be varied in, e.g., 0.1 mA increments. At the higher end of voltage, the current may be ramped downwards to, e.g., 2 mA. The length and intensity of the treatment may be controlled through the controller, e.g., controller 501. The practitioner may program the controller with the various treatment parameters or they may be pre-set or controllable in real time via a remotely located controller. In the event that the controller 501 is controlled remotely, communication to the controller 501 may be maintained through various wireless or wired modalities. The controller 501 may optionally include a user interface which allows for the practitioner and/or patient to interface with the controller 501 to enable the entry and/or display of various treatment parameters or the interface may simply comprise simplified external controls, e.g., controls which turn the treatment device on/off or pauses the treatment.

The controller may also be configured to wirelessly transmit data to and/or receive data from a device which is located remotely from the controller. Hence, the controller may transmit data sensed from the electrodes as well as receive data from the remote device, e.g., computer, laptop, tablet, smartphone, etc., such as treatment parameters, power levels, stimulation waveforms, etc. Moreover, this communication may occur through various wireless protocols, e.g., internet, cellular, RF, etc. As the controller may be configured with a network interface, this interface may be configured to remotely receive servicing or activation signals in response to brain or behavior states. All wired inputs to the controller including the charger, trigger, and network lines will be optically isolated to protect the person receiving the stimulation from voltages transferred from the wall socket.

In the event the treatment system incorporates a pause mode to allow the practitioner or user to temporarily pause a treatment session, stimulation may be resumed after the pause. The system may be configured to wait for a predetermined period of time following the initiation of the pause mode after which treatment resumes automatically or the treatment may be resumed after being affirmatively re-started by the practitioner.

After the treatment period 1104, the stimulation may be reduced over a ramp down period 1105 until the initial current level 1001 has been reached or until the system has shut off. Like the ramp up period 1103, the stimulation may be reduced over the ramp down period 1105 which may range anywhere from, e.g., 10 secs to 15 mins, during which the current may be decreased at intervals of, e.g., 1 sec. The controller 501 may be optionally programmed to prevent the sudden starting or stopping of a treatment as a safety measure and to also ensure that the ramp up period 1103 and ramp down period 1105 are sufficiently timed and stepped in intensity.

The controller 501 may be optionally further programmed to time-out or lock-out any further treatment once a treatment session has been completed for a specified period of time, e.g., 2 hrs to 36 hrs or more. This feature can be adapted and arranged as a safety feature in a number of different ways to limit use of the device to safe treatment intervals.

Additionally and/or optionally, the controller 501 may be further programmed to reverse the polarity of the electrodes 703 when placed in the electrode housing 701 following a treatment session as maintenance to prevent corrosion of the connections of the individual electrodes and preserve the useful life of the electrodes 703.

Generally, application of the electrical stimulation for treatment of subjects or patients may involve the steps of (1) recording the subject's brain activity at different states, (2) evaluating the differences between the different recorded states, (3) finite element modeling of the current paths in the brain to target brain state unique activations identified in the difference images from neuroimaging, and then (4) stimulating the subject's brain according to the modeled image; otherwise known as a ng-NIBS technique.

In determining the location for placing the electrode array upon the patient's head, c-TDCS generally involves utilizing only a general knowledge about the brain, the brain's cognitive functions, and the task at hand to target brain stimulation and is thus sub-optimal in locating and treating specific regions of the brain. Hence, all the challenges associated with c-TDCS may be overcome by utilizing neuroimaging-guided TDCS (ng-TDCS) which assumes no prior knowledge of the different brain areas, cognitive processes and the task at hand. Moreover, ng-TDCS empirically determines the brain areas that are involved in the performance of the task by measuring task-related brain activity with one or more neuroimaging modalities, e.g., magnetoencephalography (MEG), electroencephalography (EEG), functional magnetic resonance imaging (fMRI), positron emission tomography (PET), single photon emission computed tomography (SPECT), electrocorticography (ECOG), structural magnetic resonance imaging (sMRI), diffusion tensor imaging (OTT), magnetic resonance spectroscopy (MRS), functional near infrared spectroscopy (fNIRS), etc.

The brain activity is localized to the particular brain structure(s) that are activated in low performance states (e.g., novices) and high performance states (e.g. experts). The images of the brain activity in the low performance states and high performance states are then coregistered and subtracted to produce a difference image that contains only the areas of brain activity that change between low performance and high performance states.

The ng-TDCS (and related electrical, magnetic, optical, and ultrasonic NIBS methods) technique takes advantage of the fact that there are desirable brain states that lead to behaviors that are well suited to the tasks and undesirable brain states that lead to poor performance on the same tasks. Desired brain states that aide performance could be attentive, happy, expert, quick while comparable undesirable brain states might be inattentive, sad, untrained, or slow, injured. ng-TDCS uses data from, e.g., MEG, EEG, fMRI, PET, SPECT, ECOG, fNIRS, sMRI, DTI, MRS, and other technologies to record data in the desirable and undesirable brain states, and in one embodiment, maps the recorded brain activity to the structures of origin in the brain using commonly available algorithms.

The mapping to brain structures is done twice, once for desirable and again for undesirable brain states. This provides the basis for comparing and contrasting the structural and functional brain states that contribute to the difference between performance with desirable and undesirable outcomes. Thereby, determining the target brain region(s) where the influence of electrical NIBS could move the user from an undesired to a desired brain state. The ng-NIBS approach differs from the standard practice of electrical NIBS where neuroimaging is rarely used determine target brain structures. When no neuroimaging is performed the user must rely on often poorly founded assumptions about both the current paths in electrical NIBS and task-related brain activity.

This difference image is fed into a finite element model that can be used to accurately calculate the path of electrical currents through the head as they pass between electrical NIBS electrodes where at least one is placed on the scalp. The electrodes described herein may be placed at locations on the scalp that pass maximal current density through target brain tissues that differentiate brain state and task related brain activity. A single electrode polarity may be placed on the scalp at this location, e.g., either anode to enhance brain activity or cathode to suppress brain activity. The other electrode may be placed on another portion of the subject's body, e.g., the upper arm, to eliminate problems caused by the placement of both anode and cathode on the scalp. This aspect straightforwardly enhances or suppresses brain activity without any complicating effects of both electrodes on the scalp. Utilizing this ng-TDCS treatment can increase learning performance by 100% rather than the 10%-20% commonly observed in c-TDCS experiments.

For evaluating the differences between brain states, the ng-NIBS technique calculates the target for electrical NIBS by comparing and contrasting MEG, EEG. fMRI, PET, SPECT, ECOG, fNIRS, sMRI, DT1, MRS, and other techniques from two different brain states. In one embodiment, the calculation could be made across individuals where a group of individuals with a desired brain state is compared to a group of individuals with an undesirable brain state; inattentive individuals could be compared to those who are attentive, expert individuals could be compared to novices, depressed individuals could be compared to healthy subjects, brain injured individuals could be compared to healthy individuals, individuals that perform a cognitive operation quickly could be compared to those who work more slowly. This is a "one size fits most" approach to the problem of optimizing ng-NIBS.

In another embodiment, neuroimaging methods compare brain states within individuals across time, i.e. the brain states associated with correct responses could be compared to those recorded during incorrect responses, attentive could be compared to inattentive, novice could be compared to expert, tired could be compared to wide awake. The comparison of desirable and undesirable brain state within an individual could be used to develop customized electrode arrangements for ng-NIBS in each individual.

In yet another aspect, the present technology can employ various kinds of comparisons of various kinds of brain activities with respect to the same brain in order to determine the most advantageous locations or conformations of electrodes. Thus, the analyses of one or more brain activities that are used to determine the correctly positioned or conformed electrodes and arrays of electrodes for delivering electrical NIBS can include many different parameters. Such parameters include, but are not limited to, the location, amplitude, timing, phase, frequency, and duration of one or more activities in one or more brain areas. The recorded brain activity thus obtained is especially useful when the data recorded gives information about the consistency or causation of amplitude relationships, time relationships, phase relationships, frequency relationships, and the duration relationships across multiple similar events processed by the brain, or across regions in the brain. However, the application of this method to determine the optimal brain targets for electrical NIBS is both innovative and extremely useful. The ng-NIBS approach allows both functional (e.g., MEG, EEG, fMRI, tNIRS, PET, SPECT, ECOG, and MRS) and structural (e.g., sMRI, DTI) comparisons between and within subjects. Previous studies have shown that one type of electrical NIBS, TDCS, can alter measures of DTI that indicate the white matter tracts in the brain have decreased radial diffusivity in the hemisphere ipsilateral to stimulation.

This is typically interpreted as increased myelination and/or healthier white matter. This raises many possibilities for the uses of electrical NIBS in rehabilitation and white matter diseases of the brain that occur with aging, Virchow-Robin Perivascular Spaces, deep white matter ischemia, multiple sclerosis, progressive multifocal leukoencephalopathy, post-infections encephalitis, HIV related encephalitis, radiation injury, chemotherapy neurotoxicity (chemobrain), posterior reversible encephalopathy syndrome, central pontine myelinolysis, the leukodystrophies and the adreno leukodystrophies, as well as peripheral and central nervous system damage from traumatic brain injury, concussion, chronic traumatic encephalopathy, spinal cord injury, and stroke. All of these diseases could be treated with the embodiments that do comparisons across or within individuals to identify targets for electrical NIBS in the CNS. The idea of comparing and contrasting brain activity in two conditions or across two populations is not novel. However, evaluating the differences in advanced neuroimaging techniques between populations in order to guide electrical NIBS is quite novel. This approach has been used successfully to double the rate of learning in multiple laboratories and on multiple tasks. This allows for evaluation of the differences between desired and undesired brain states.

Furthermore, the ng-TDCS is a method that could be expanded to include different types of brain stimulation. For instance, ng-TDCS becomes neuroimaging-guided non-invasive brain stimulation (ng-NIBS) and the principles of ng-NIBS could be expanded to include, e.g., transcranial magnetic stimulation (TMS), repetitive TMS (rTMS), pulsed electromagnetic fields (PEMF), transcranial alternating current stimulation (TACS), transcranial random noise stimulation (TRNS), time varying electrical stimulation (TVES), ultrasound brain stimulation (UBS), etc. Moreover, the various hardware and software combinations may allow for the channels to operate with independent or common references to create TDCS, TACS, TRNS, and TVES presentable in any combination across single or multiple channels.

In recording the brain activity of a subject's brain, the step or action of (1) recording brain activity (data) may be accomplished by any one or more imaging modalities, as described herein, during desirable and non-desirable brain states. Examples of desirable brain states which are useful for practicing the present methods include: attentive, expert, healthy, uninjured, cognitively fast, and cognitively flexible. Examples of undesirable brain states include: inattentive, untrained, depressed, brain injured (such as TBI), cognitively slow, cognitively rigid.

In another aspect, one embodiment of a method of the invention includes the step or action of (2) evaluating the differences in the subject brain or brains between desirable and non-desirable brain states. This difference evaluation is performed with respect to the brain activity data obtained by one or more of the initial steps or actions of this embodiment of the method of the invention. The results of this difference evaluation between desirable and non-desirable brain states can then be used to determine portions, regions or parts of the subject brain or brains which are suitable targets for electrical NIBS. By effecting NIBS of these target parts of the subject brain or brains, brain circuitry can influenced to transition from an undesirable to a desirable state. The advantages of this transition can be numerous.

In yet another aspect, the data obtained in the present method can be used to (3) virtualize the differences between the desirable and non-desirable brain states to effect a determination of one or more advantageous electrode array designs and configurations which are suitable for specific desired purposes, such as the teaching of languages, the enhancing of decision making, the increasing of vigilance, the increasing of cognitive flexibility, the enhancing of creativity, the teaching of the correct accents for languages, the increasing of attention, the enhancing of sleep. the reversing of brain damage (such as that associated with traumatic brain injury, stroke, concussion, hypoxia, and chemical or other injury), and the treating of symptoms of mental illness (i.e. reducing hallucinations, elevating mood, alleviating flattened affect, reducing anxiety, reducing insomnia, reducing unwanted memory, enhancing social skills, reducing repetitive thoughts, reducing social phobias).

With the present technology, electrodes and electrode arrays can be designed and configurations of arrays as described herein, including how the electrodes communicate with one another and with other components of the invention, can be effected to maximize the effectiveness of NIBS-based neurological interventions. Such designs and configurations can be effected with respect to, among other factors, spatial positions of the electrodes in two or more dimensions, the respective polarities of the electrodes, the timing of activity on or between electrodes, the frequency (typically in terms of Hz) delivered by one or more electrodes, the frequency of stimulation in terms of repetition of a determined stimulation regimen, the latency of the stimulation, if any, on an electrode or electrodes with respect to environmental events, the correlation among stimulation parameters across electrodes, the correlation of stimulation with environmental events, the phase relationships among stimulation parameters across electrodes, the duration of stimulation on an electrode or electrodes and the relationships of these durations across electrodes, causal inferences from recordings of activity that are replayed to the brain via an electrode or electrodes, and the intensity or intensities of the electrical stimulation delivered by the respective electrodes, such that the NIBS stimulations can have the greatest desirable influence on targeted brain areas.

Traditional neuronal signal modeling mechanisms have significant limitations. Available brain signal decoding mechanisms only directly measure simple signatures of behavior like the increase or decrease of alpha desynchronization. However, such techniques do not estimate a real state to be modified. For example, alpha desynchrony may just be overall arousal state. Other traditional systems like univariate and unimodal systems are not able to accurately model complicated neural systems. Such simple models do not account for cross impacts of sub-systems or multiple modalities of measurements, and are not able to detect or identify various states or parameters that are to be monitored and controlled. Some other traditional techniques are open loop techniques with electrical or magnetic stimulation of different regions with manual tuning and long term behavior tracking that are not only inefficient but can also be erroneous. Such techniques may result in over-stimulation and/or under-stimulation.

Various embodiments disclosed herein provide the ability to obtain measurements from a brain of a user, and generate various brain state parameters characterizing one or more features of at least one brain state of the user, as well as various models of the brain of the user. Such brain state parameters implemented in conjunction with the generated models provide a closed loop adaptive therapeutic system that may obtain measurements, generate a generalized or user specific functional and/or structural model of the brain, estimate desired brain signatures and states, generate control signals to obtain such desired brain states, and obtain additional measurements if appropriate to continuously adjust the signals and the models. In this way, various embodiments disclosed herein provide therapeutic and cognitive modulation techniques that are adaptive closed loop techniques that provide, among other things, desired modulations with increased efficiency and efficacy.

Furthermore, embodiments disclosed herein provide the applicability of various machine learning and artificial intelligence modalities to brain stimulation in a closed loop manner, in which inputs and outputs may be provided to and received from the brain in an adaptive and dynamic manner. As will also be discussed in greater detail below, improvements to augmented reality and virtual reality are also provided by enhancing perception associated with such technical fields via brain stimulation. Also discussed in greater detail below are improvements that facilitate the implementation of hybrid therapies that may include a combination of pharmaceutical agents as well as brain stimulation. In some embodiments, such hybrid therapies are implemented in a closed loop manner. In various embodiments, cognitive conditions and/or impairments may be mitigated and/or treated via brain stimulation. For example, conditions such as depression may be treated. In another example, cognitive decline associated with aging may be treated. Epileptic and non-epileptic seizures, traumatic brain injury, and post-concussive symptoms may be mitigated and/or treated as well.

Further embodiments disclosed herein provide the applicability of various machine learning and artificial intelligence modalities to providing mediation of traumatic brain injury. In some embodiments, machine learning and artificial intelligence modalities are utilized for determining and providing a procedure for mediation for the administration of brain stimulation following the onset of a neural condition, as well as the frequency of brain stimulation sufficient for mitigation and/or treatment of the condition. For example, following a traumatic brain injury (TBI) leading to post-concussive symptoms, machine learning techniques may be utilized to systematically determine, given one or more sets of data relating to past brain stimulation time frames for the same condition, the most effective and optimal procedure for mediation of a traumatic brain injury, including a schedule or optimal time frame for administering brain stimulation in order to decrease the negative post-concussive symptoms resulting from the brain injury.

FIG. 11 illustrates an example of a system for providing closed loop control in treatments and cognitive enhancements, configured in accordance with some embodiments. In some embodiments, system 1100 includes an interface, such as interface 1102. In various embodiments, interface 1102 is a brain interface that is configured to be coupled with a brain, such as brain 1101. As will be discussed in greater detail below, such coupling may provide bidirectional communication, or may be used for various sensing modalities. In some embodiments, interface 1102 includes various electrodes, as may be included in an electrode array. Such electrodes may be included in a scalp potential electroencephalogram (EEG) array, may be deep brain stimulation (DBS) electrodes, or may be an epidural grid of electrodes. In other examples, interface 1102 may include optogenetics mechanisms for monitoring various neuronal processes. Mechanisms may be used to make various measurements and acquire measurement signals corresponding to neural activity. As used herein, neural activity may refer to spiking or non-spiking activity/potentiation.

In various embodiments, such measured signals may be electrical signals derived based on neural activity that may occur in cortical tissue of a brain. Such measurements may be acquired and represented in a time domain and/or frequency domain. In this way, neural activity may be monitored and measured over one or more temporal windows, and such measurements may be stored and utilized by system 1100. In various embodiments, such neural activity may be observed for particular regions of cortical tissue determined, at least in part, based on a configuration of interface 1102. In one example, this may be determined based on a configuration and location of electrodes included in interface 1102 and coupled with the brain.

According to some embodiments, one or more components of interface 1102 are configured to provide stimuli to the brain coupled with interface 1102. For example, one or more electrodes included in interface 1102 may be configured to provide electrical stimuli to cortical tissue of the brain. As discussed above, such electrodes may be implemented utilizing one or more of various modalities which may be placed on a user's scalp, or implanted in the user's brain.

As will be discussed in greater detail below, such actuation and stimuli provided by interface 1102 may be of many different modalities. For example, stimuli may be aural, visual, and/or tactile as well as being electrical and/or magnetic, or any suitable combination of these. Accordingly, interface 1102 may further include additional components, such as speakers, lights, display screens, and mechanical actuators that are configured to provide one or more of aural, visual, and/or tactile stimuli to a user. In this way, any suitable combination of different modalities may be used. For example, a combination of electrical and aural stimuli may be provided via interface 1102. Further still, interface 1102 may include different portions corresponding to signal acquisition and stimuli administration. For example, a first portion of interface 1102 may include electrodes configured to measure neural activity, while a second portion of interface 1102 includes speakers configured to generate aural stimuli. In various embodiments, the visual and/or auditory stimuli may be provided via one or more communications channels that are configured to provide such stimuli. For example, such stimuli may be provided via a streaming media service or a social networking service. In one example, such stimuli may be provided via a dedicated YouTube channel that is streamed to interface 1102.

In some embodiments, interface 1102 further includes one or more dedicated processors and an associated memory configured to obtain and store the measurements acquired at interface 1102. In this way, such measurements may be stored and made available to other system components which may be communicatively coupled with interface 1102.

System 1100 further includes first processing device 1104 which is configured to generate brain state parameters that may characterize and identify features of brain states and generate estimations of brain state signatures. In various embodiments, a brain state may refer to one or more identified patterns of neural activity. Accordingly, such brain states may be one or more identified patterns, such as oscillation or fluctuation of activity at a particular frequency band, such as low oscillatory behavior as well as delta, theta, alpha, beta, and gamma waves. Furthermore, such brain states may be identified based on coupling between patterns of neural activity. For example, a brain state may be identified based on oscillation or fluctuation of activity at a particular frequency band, and an increase of activity in another. Other brain states may correspond to phase resets in prefrontal and cingulate areas. Phase resets may correspond to coherent activity in widespread cortical regions and impact timing of neuronal activity. Activity patterns in the prefrontal cortex can be monitored, identified, and controlled for associations with particular behaviors including goal directed behavior. Neuronal synchronization and desynchronization may be detected and managed using closed loop control based on intelligent and continuously adaptive neurological models. As will be discussed in greater detail below, such identification may be implemented based, at least in part, on various parameters, such as observers and estimators.

Accordingly, first processing device 1104 is configured to generate one or more particular observers and/or estimators that may form the basis of identification and estimation of brain states, described in greater detail below. As discussed above, first processing device 1104 may be configured to generate deterministic and stochastic observers and estimators of brain states based on acquired measurements. Such deterministic observers may provide robustness to exogenous disturbances, while such stochastic estimators may provide robustness regarding noise. For example, first processing device 104 may be configured to implement linear and nonlinear observation and estimation modalities such as luenberger, kalman, sliding mode, and benes filters. The application of such observation and estimation modalities may be used to generate and infer one or more parameters associated with brain states. For example, such parameters may identify aspects of particular brain states, such as an oscillation or resonance frequency as well as a coupling and/or weighting factor associated with one or more other brain states. In a specific example, a condition of Schizophrenia may be modeled as a pair of oscillators, each being an oscillating neural pattern, and first processing device 1104 may be configured to identify and determine resonance frequencies and coupling factors associated with the oscillators based on the previously described acquired measurements.

Thus, according to various embodiments, first processing device 1104 may be configured to implement direct and indirect state signature estimation. First processing device 1104 may also be configured to implement brain system model parameter identification and adaptation. Furthermore, first processing device 1104 may also be configured to generate an estimation of the stability of underlying hidden states, as well as noise estimation and rejection in underlying measurements. In various embodiments, first processing device 1104 may also be configured to implement cognitive relevance based measurement window sizing. Accordingly, measurement windows may be sized based on cognitive relevance measures, and may be sized dynamically.

In some embodiments, first processing device 1104 is configured to implement baseline estimation and removal which may enhance sensitivity regarding signatures/events. As discussed above, neural activity may be measured and represented in a time domain and/or a frequency domain. In one example, when represented in a frequency domain, the neural activity may be represented as a power spectrum that follows a plot that is logarithmic or non-linear. Accordingly, in various embodiments, first processing device 1104 is configured to implement one or more curve-fitting modalities to estimate a baseline of the plot, and remove such baseline to provide a more accurate representation of more granular features of the measured signal. Such granular features may be represented with greater accuracy, and be used to identify parameters of brain states with greater accuracy.

First processing device 1104 may also be configured to implement learning estimator models that learn state changes and estimate them. Such learning estimator models may also learn changing system parameters, and estimate the improvement/retrograde of behavioral/functional responses.

As similarly discussed above, observers and estimators may be used to identify and/or infer state signatures and parameters associated with brain states. For example, examples of brain state signatures may include certain lower frequency oscillations mediated with or coupled to higher frequency oscillations (delta to alpha, alpha to gamma, theta to mu, alpha to high frequency band) that correspond with various levels of cognitive ability and various types of cognitive conditions to detect and identify signatures indicative of particular types of cognitive performance or cognitive conditions.

According to various embodiments, slow wave coupled spindle synchrony during sleep may be used as a signature of memory retention and consolidation. In particular embodiments, a closed loop control system may be configured to monitor and improve slow wave coupled spindle synchrony. In another example, first processing device 1104 is configured to detect multiplexed parallel delta to theta, alpha to beta, delta/theta/alpha to high-frequency-band coupling to identify a signature of working memory. In yet another example, first processing device 1104 is configured to monitor and/or control a baseline rate of exponential decay in a spectral composition of neural activity, as well as deviations from the baseline to identify and predict a cognitive and arousal state, such as an inhibitory or excitatory state. In various embodiments, first processing device 1104 may also be configured to monitor beta synchronization or desynchronization to identify a signature of motor activity intent. In this way, any number of brain states and associated signature and parameters may be identified and estimated by first processing device 1104. In some embodiments, first processing device 1104 may be configured to identify an "activity silent" mode associated with a user in which a measure of activity is measured and tracked as a mental state shift indicator.

System 1100 further includes second processing device 1106 which is configured to generate functional and structural models of the brain coupled with interface 1102. In various embodiments, second processing device 1106 is further configured to provide brain functional model identification and adaptive learning, as well as brain structural models with adaptive learning. In various embodiments, second processing device 1106 is communicatively coupled with interface 1102, first processing device 1104, as well as controller 1108 discussed in greater detail below. Accordingly, second processing device 1106 may receive input signals from one or more other system components and utilize such inputs to form and/or update functional and structural models of the brain coupled with interface 1102. In various embodiments, second processing device 1106 may also be configured to pre-process inputs received from interface 1102 and first processing device 1104 to generate one or more composite inputs.

In various embodiments, second processing device 1106 is configured to generate functional input-output univariate and multivariate models that may be configured to approximate at least some of the input-output behavior of the brain coupled with interface 1102 described above. In some embodiments, second processing device 106 is also configured to implement adaptive learning brain models that may iteratively update and improve the functional model of the brain that has been constructed.

In some embodiments, second processing device 1106 is configured to implement deep/machine learning and data mining based system models. Accordingly, second processing device 1106 may be configured to implement one or more artificial neural networks that may be configured to model tasks or cognitive functions of the brain. Such neural networks may be implemented in a hierarchical manner. Moreover, such neural networks may be trained based on signals received from other components of system 1100. For example, models may be trained based on inputs provided to interface 1102 from controller 1108 and outputs measured via interface 1102 as well as observers and estimators generated by first processing device 1104.

In this way, input and output activity within system 1100 may be used, at least in part, to construct functional and structural models represented by second processing device 1106. More specifically, the artificial neural networks created by second processing device 1106 may be modified and configured based on activity of the human brain. In this way, the artificial neural networks created by second processing device 1106 may be specifically configured based on behaviors and processing patterns of the human mind.

In some embodiments, second processing device 1106 is further configured to construct artificial neural networks that alter one or more parameters of treatment or administration of brain stimulation on an individual, based on one or more received inputs. In some embodiments, such parameters of treatment may include the schedule or nature for administration of brain stimulation treatment, as well as the time frame, duration, frequency, and/or strength of treatment following a brain injury. In some embodiments, the one or more received inputs may be received information regarding the efficacy or likelihood of success or mitigation of symptoms of a brain injury in relation to the time frame of administration of brain stimulation treatment. In some embodiments, the artificial neural networks are modified or adjusted based on updated datasets or additional input information corresponding to the timing of treatments and the results of treatments. For example, such input information may be training data that is utilized by neural networks upon which one or more machine learning algorithms are executed, such that the neural networks learn improved techniques for how to more effectively administer brain stimulation treatments, including adjusted timing, duration, frequency, and/or nature of treatments.

In various embodiments, second processing device 1106 is further configured to implement system identification, dimensional modeling, and dimension reduction to identifying preferred models. Furthermore, second processing device 1106 may be configured to implement identification of one or more brain states to be controlled, as may be determined based on actuation sensitivity and efficacy. In various embodiments, second processing device 1106 is configured to implement identification of the most sensitive brain states to be measured. Such identification may identify the most sensitive and granular measurement that identifies the brain state changes. In some embodiments, second processing device 1106 is configured to implement multi-input, multi-output measurement and actuation. In some embodiments, second processing device 1106 is further configured to multi-time scale modelling (to capture the slow system and fast system dynamic accurately). In various embodiments, second processing device 1106 is also configured to implement one or more neural net basis functions that may be configured and or generated based on activity of the brain. For example, such functions may include spike functions, multi-input-coevolution triggered firing (such as coherence, synchrony, coupling, correlation of two waveforms triggering a cell firing).

In some embodiments, second processing device 1106 is further configured to capture or record results of treatments and various parameters and information related to treatments, including pieces of information relating to the efficacy of treatments and/or the mitigation or lack of mitigation of one or more symptoms of an injury. In some embodiments, second processing device 1106 is also configured to capture or record the time frames of various treatments of individuals. In some embodiments, time frames include the timing, duration, frequency, and/or nature of treatments following the event of an injury to the brain. In some embodiments, second processing device 1106 is configured to retrieve existing or historical information or datasets relating to treatments, such as information relating to the efficacy of treatments or time frame of treatments, including timing, duration, frequency, and or nature of treatments following the event of an injury to the brain.

While first processing device 1104 and second processing device 1106 have been described separately, in various embodiments, both first processing device 1104 and second processing device 1106 are implemented in a single processing device. Accordingly, a single processing device may be specifically configured to implement first processing device 104 and second processing device 1106.

System 1100 further includes controller 1108 configured to implement and control closed loop control of treatments and cognitive enhancements. In various embodiments, controller 108 is communicatively coupled with interface 1102, first processing device 1104, and second processing device 1106. Accordingly, controller 1108 is configured to receive inputs from various other system components, and generate outputs based, at least in part on such inputs. As will be discussed in greater detail below, such outputs may be used to provide actuations to the brain coupled with interface 1102. For example, outputs generated by controller 1108 may be used to stimulate the brain via one or more components of interface 1102. In this way, controller 1108 may provide stimuli to the brain via interface 1102, may receive measurements, parameter information, and model information via other components such as first processing device 1104 and second processing device 1106, and may generate updated stimuli based on such received information.

Thus, according to some embodiments, controller 1108 is configured to implement multi-input, multi-output feedback control. Controller 1108 may also be configured to implement loop shaping optimized feedback control. In a specific example, controller 1108 is configured to implement model reference adaptive control. Furthermore, controller 1108 may be configured to implement cognitive enhancement trajectory control. In various embodiments, controller 1108 is configured to implement enhanced control in which one or more parameters of a treatment may be enhanced by increasing its efficiency and/or effect. For example, an input or stimulation may be reduced to implement a same enhancement, a duration of stimulations may be reduced but still reach desired improvement, and a path of recovery may be made more efficient. In this way, an amount of stimulation, which may be a combination of amplitude and duration, may be reduced while still obtaining a desired effect, thus increasing the efficacy of the treatment and reducing overstimulation. In various embodiments, controller 1108 is configured to implement a genetic algorithm to identify a particular stimulation pathway that reduces an amount of stimulation.

In some embodiments, controller 1108 is configured to implement combined control of pharmacological and stimulation inputs. Accordingly, controller 1108 may be configured to modify stimulation inputs based on an expected effect of one or more pharmacological agents that may be administered in conjunction with the stimulation. In this way, controller 1108 may modify and control administration of stimuli via interface 1102 based on an identified pharmacological regimen. In various embodiments, controller 1108 is configured to implement game theoretic strategy-based treatments. In some embodiments, controller 1108 is configured to implement real time measurement/estimation and control.

In various embodiments, controller 1108 is configured to receive a reference signal which may be used, at least in part, to generate or modify the stimuli provided via interface 1102. In various embodiments, the reference signal may be a previously determined signal or pattern that may represent a reference level or pattern of neural activity. In some embodiments, the reference signal may be generated based on a "negative" model. In a specific example, such a negative model may be a functional and/or structural model that is generated based on a reverse or inversion of one or more of the models created and stored by second processing device 1106. Accordingly, such a negative model may be generated by second processing device 1106, and the reference signal may be generated by second processing device 1106 and received at controller 1108.

As will be discussed in greater detail below, the above-described components of system 1100 may be specifically configured to provide one or more particular applications. For example, system 1100 may be configured to provide bio-signal interpretation for status monitoring and diagnostics. Accordingly, the brain state information observed and derived by at least first processing device 1104 and second processing device 1106 may be used to identify brain states, the onset of particular brain states, and particular transitions between brain states. Such events may be detected, and notifications may be generated by, for example, first processing device 1104, second processing device 1106, or controller 1108. Such notifications may be provided to other entities, or client devices 1110, that may be involved in status monitoring and diagnostics, such as computing and mobile devices associated with medical professionals, or a user's in-home medical system.

In various implementations, client device 1110 may be any one of various computing devices such as laptop or desktop computers, smartphones, personal digital assistants, portable media players, tablet computers, or other appropriate computing devices that can be used to communicate over a global or local network, such as the Internet. In various embodiments, client device 1110 may be configured to communicate with the first processing device 1104, second processing device 1106, and/or controller 108.

In some embodiments, client device 1110 may receive information from the various other components, such as device status, performance or function information, predictive models, brain state parameters, diagnostic information, mediation procedures, etc. For example, the brain state parameters generated by first processing device 1104 may be transmitted to client device 1110. In some embodiments, functional and structural models of the brain generated by second processing device 1106 may be transmitted to client device. As another example, particular control signals may be communicated to controller 1108 form client device 1110 to be sent to interface 1102 or prosthetic 1112. In some embodiments, client device 1110 may also be configured to directly communicate with interface 1102 or prosthetic 1112, for example to transmit control signals or monitor device status.

Moreover, system 1100 may be configured to provide augmented reality (AR)-virtual reality (VR) for cognitive enhancements and side-effect removal. For example, brain state and associated parameter detection may be used to identify the onset of particular cognitive states, such as motion sickness. When detected, or even when the onset is detected, controller 1108 may generate one or more stimuli, which may be visual stimuli, tactile stimuli, and/or electric stimuli, to alleviate the detected cognitive state. In this way, motion sickness associated with VR may be alleviated. In various embodiments, brain stimulation may be used to enhance sensory perception associated with AR and VR. Accordingly, one or more stimuli may be provided via interface 1102 where such stimuli are determined based on the AR or VR program, and such stimuli may enhance or improve the experience of the AR or VR program.

In various embodiments, system 1100 is configured to provide cognitive and behavioral modulation specific to a particular psychological or neurophysiological condition. For example, a condition such as depression may be characterized by a frozen brain state, or a brain state that does not oscillate as a normal brain would. In various embodiments, system 1100 may be configured to identify a particular brain state, identify that it is "frozen" (has not changed over a designated period of time), and generate one or more control signals that are configured to stimulate the user's brain and change the brain state of the user by virtue of the stimulation to alleviate the depression. In another example, such generation of control signals may be used to alleviate or manage pain, as may be applicable with chronic pain. Such control signals associated with pain management may be implemented using multi-modal (multi-sensory) stimulation. In yet another example, generation of control signals may be utilized for stimulation based reversal of 'minimally-conscious' or 'comatose' brain states of users. In an additional example, such control signals may be used to mitigate or alleviate age based cognitive decline. Accordingly, stimuli may be provided via interface 1102 to stimulate areas having diminished activity due to the process of aging.

In some embodiments, system 1100 may be configured to provide system and pathology specific functional brain models, as may be utilized in pharmacological applications. Accordingly, as discussed above, the use of pharmacological agents may be identified, and models may be updated in response to such pharmacological agents being identified. In this way, administration of stimuli via interface 1102 may be modified and updated based on the application of a pharmacological agent to a user. More specifically, such modifications may be implemented based on the identification of the use of pharmacological agents, as well as directly measured neural activity of the user during the treatment process.

In another example, system 1100 may be configured to provide model based adaptive control paradigms for feedback treatments and cognitive enhancements. Accordingly, as discussed above, treatments and cognitive enhancements may be provided with adaptive closed loop control that enables the modification and updating of such treatments and cognitive enhancements based on directly measured neural activity over the course of the treatments and cognitive enhancements.

In various embodiments, system 1100 may be configured to provide smart embedded prosthetics (e.g. speech decoder, motor control). Accordingly, signals generated by controller 1108 may be used to control one or more embedded prosthetics, such as prosthetic 1112. In some embodiments, prosthetic 1112 may be an implanted stimulator that may be activated by controller 1108 in response to the detection or identification of one or more brain states or parameters associated with such brain states. In some embodiments, prosthetic 1112 may be a component of interface 1102 or communicatively coupled to interface 1102.

In a specific example, prosthetic 1112 may be a stimulator configured to prevent epileptic episodes. In this example, controller 1108 may identify a brain state corresponding to an onset of an epileptic seizure, and may provide a signal to prosthetic 1112 that activates prosthetic 1112 to prevent the seizure. For example, prosthetic 1112 may comprise a multichannel closed-loop neural-prosthetic system-on-chip (SoC) configured for real-time intracranial electroencephalogram (iEEG) acquisition, seizure detection, and electrical stimulation in order to suppress epileptic seizures.

In some embodiments, system 1100 may be configured to provide a toolbox configured to support estimation, modeling, and control. In another example, system 1100 may be configured to provide a bio operating system (BoS) framework for biological measurement and an actuation control platform. As discussed above, such an operating system may be implemented on a variety of platforms including a mobile platform such as mAndroid. In some embodiments, system 1100 may be configured to provide task specific cognitive enhancements, such as FAA monitoring agents, and fighter pilot related tasks.

System 1100 and its respective components may be implemented in a variety of contexts. For example, system 1100 may be implemented in a clinical setting that may include an examination room, an operating room, or an emergency room. Moreover, system 1100 may be implemented in a user's home thus providing in-home monitoring, diagnostic, and treatment. Furthermore, portions of system 1100 may be implemented in a first location while other portions are implemented in a second location. For example, interface 1102 may be located at a user's home, while first processing device 1104, second processing device 1106, and controller 1108 are implemented remotely, as may be the case when implemented at a hospital.

Furthermore, system 1100 may be implemented across multiple users. For example, system 1100 may include multiple interfaces that are coupled with multiple brains. In this way, measurements may be made from multiple users, and stimuli may be provided to multiple users. In one example, measurements from a first user may be used to generate and provide stimuli to a second user. In this way, synchronization of at least part of a brain state may be implemented across multiple users.

Figure 12:
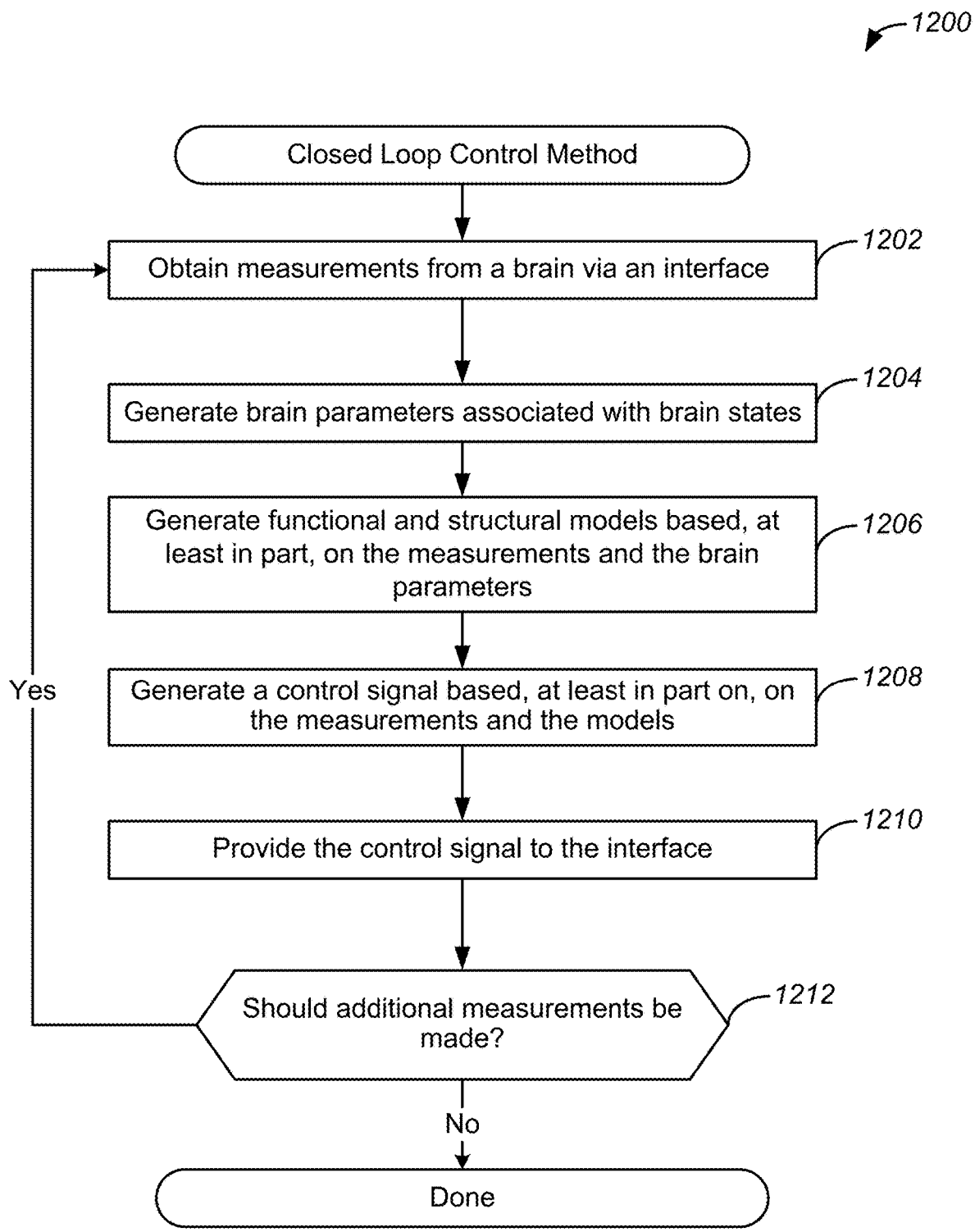
FIG. 12 is an example of a flow chart of a method for providing closed loop control in treatments and cognitive enhancements, implemented in accordance with some embodiments.

FIG. 12 illustrates an example an example of a flow chart of a method for providing closed loop control in treatments and cognitive enhancements, implemented in accordance with some embodiments. As discussed above, various components of system 100 may be configured to implement modeling and closed loop management of treatments and therapies provided to a user.

Accordingly, method 1200 may commence with operation 1202 during which measurements are obtained from a brain via an interface. The measurements may represent neural activity over a particular period of time, or temporal window, and may be obtained via components of a brain interface. Such measurements may be acquired and stored in a memory.

Method 1200 may proceed to operation 1204 during which parameters associated with brain states are generated. As similarly discussed above, such parameters may include observers and estimators associated with brain states as well as identification of the brain states themselves. Such parameters may be generated by a first processing device and may be stored in a local memory.

Method 1200 may proceed to operation 1206 during which functional and structural models are generated based, at least in part, on the measurements and the parameters. As discussed above, such models may emulate functions, tasks, and components of the user's brain, and may be configured based on the brain's activity and behavior. Such models may also be configured based on previously obtained reference data.

Method 1200 may proceed to operation 1208 during which a control signal is generated based, at least in part on, on the measurements and the models. Accordingly, one or more control signals may be generated based on recent neural activity represented by measurement data, and also based on expected or desired effects as determined based on the models. In this way, specific control signals may be generated to implement a particular cognitive modulation that is specifically configured for the user. Moreover, as discussed above and in greater detail below, such control signals may be generated and implemented in a closed loop manner.

Method 1200 may proceed to operation 1210 during which the control signal is provided to the interface. Accordingly, the control signal may be provided to the interface which may generate one or more stimuli based on the control signal. For example, such stimuli may include electrical stimuli, visual stimuli, aural stimuli, and/or tactile stimuli that may have parameters, such as amplitude and duration, determined based on the control signal.

Method 1200 may proceed to operation 1212 during which it may be determined if additional measurements should be made. In various embodiments, such a determination may be made based on a current state, or in response to one or more conditions. For example, if a particular therapeutic regimen is implemented, a series of measurement may be made according to a predetermined schedule, and such measurements may be stepped through utilizing a state machine. If it is determined that additional measurements should be made, method 1200 may return to operation 1202. If it is determined that no additional measurements should be made, method 1200 may terminate.

Figure 13:
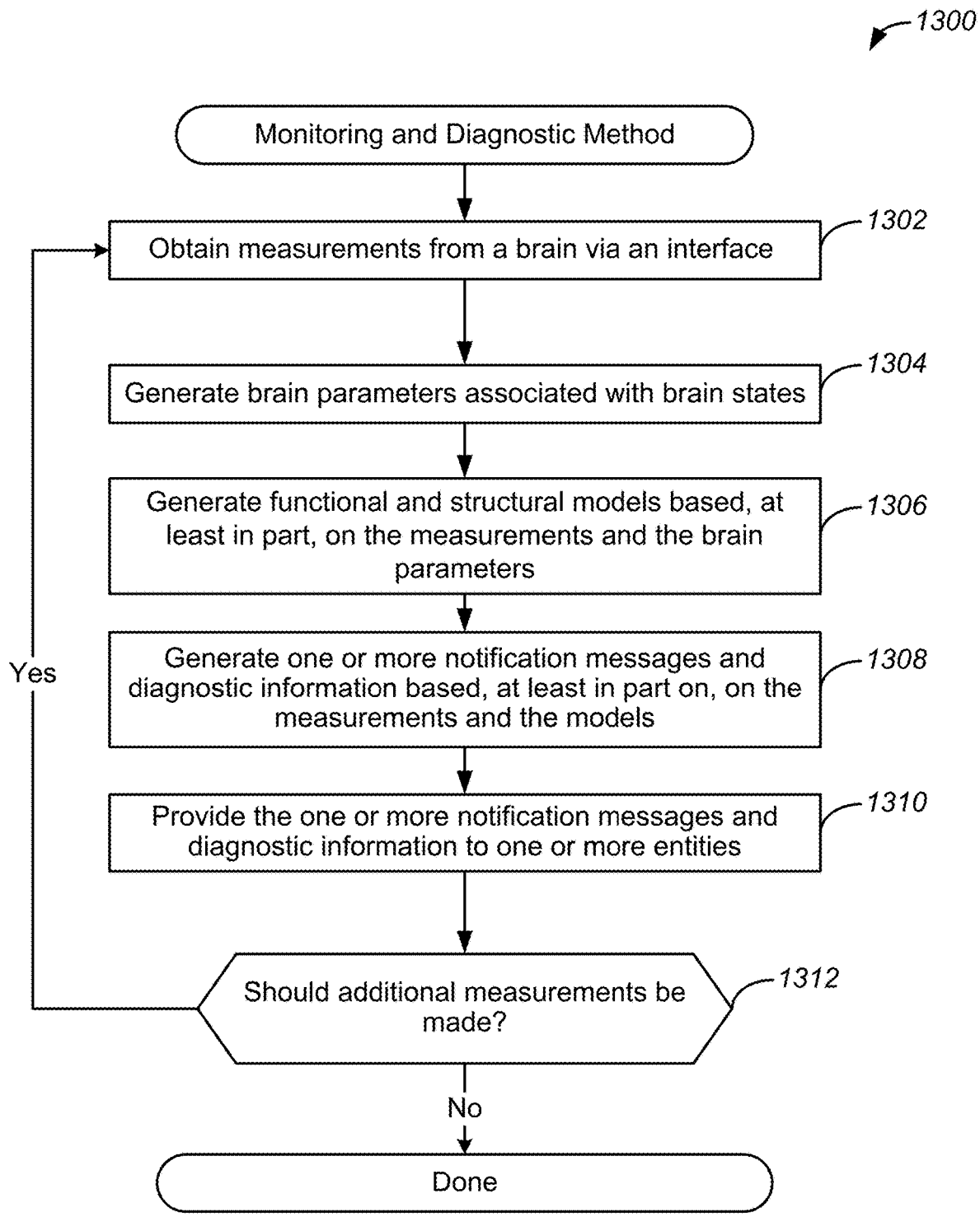
FIG. 13 illustrates a flowchart of an example of a method for status monitoring and diagnostics, implemented in accordance with some embodiments.

FIG. 13 illustrates an example of a flow chart of a method for status monitoring and diagnostics, implemented in accordance with some embodiments. As discussed above, various components of system 1100 may be configured to identify particular brain states of a user based on the measured neural activity of a user, and may be further configured to generate notification messages or other status monitoring and diagnostic information.

Method 1300 may commence with operation 1302 during which measurements are obtained from a brain via an interface. As similarly discussed above, such measurements may represent neural activity over a particular period of time, or temporal window, and may be obtained via components of a brain interface. In various embodiments, the neural activity may be associated with a particular cognitive or therapeutic condition, and the acquisition of such measurements may be implemented responsive to detection of an event or one or more other conditions.

Method 1300 may proceed to operation 1304 during which parameters associated with brain states are generated. As similarly discussed above, such parameters may include observers and estimators associated with brain states as well as identification of the brain states themselves. As also discussed above, such parameters may be utilized to identify one or more brain states associated with a particular cognitive or therapeutic condition.

Method 1300 may proceed to operation 1306 during which functional and structural models are generated based, at least in part, on the measurements and the parameters. As discussed above, such models may emulate functions, tasks, and components of the user's brain, and may be configured based on the brain's activity and behavior. Such models may also be configured based on previously obtained reference data and/or previously obtained measurements.

Method 1300 may proceed to operation 1308 during which one or more notification messages and diagnostic information are generated based, at least in part on, on the measurements and the models. Accordingly, messages and other diagnostic information may be generated based on recent neural activity represented by measurement data and the generated models. In this way, specific identified parameters and brain states may be mapped to therapeutic conditions, or the onset of such conditions, and messages may be generated that provide one or more other entities with a notification of the occurrence of such brain states. In this way, diagnostic messages identifying the onset of particular brain states and therapeutic conditions of a user may be generated and sent to one or more other entities. As will be discussed in greater detail below, such other entities may be monitoring entities.

Accordingly, method 1300 may proceed to operation 1310 during which the one or more notification messages and diagnostic information are provided to one or more entities. In various embodiments, the one or more entities may be computing devices associated with monitoring entities such as medical professionals, or a user's account. In this way, notification and diagnostic messages may be automatically generated and sent to various entities responsive to the neural activity of the user.

Method 1300 may proceed to operation 1312 during which during which it may be determined if additional measurements should be made. As similarly discussed above, such a determination may be made based on a current state, or in response to one or more conditions. For example, additional measurements may be made responsive to an input provided by another entity, which may be a monitoring entity, or according to a predetermined schedule. If it is determined that additional measurements should be made, method 1300 may return to operation 1302. If it is determined that no additional measurements should be made, method 1300 may terminate.

Figure 14:
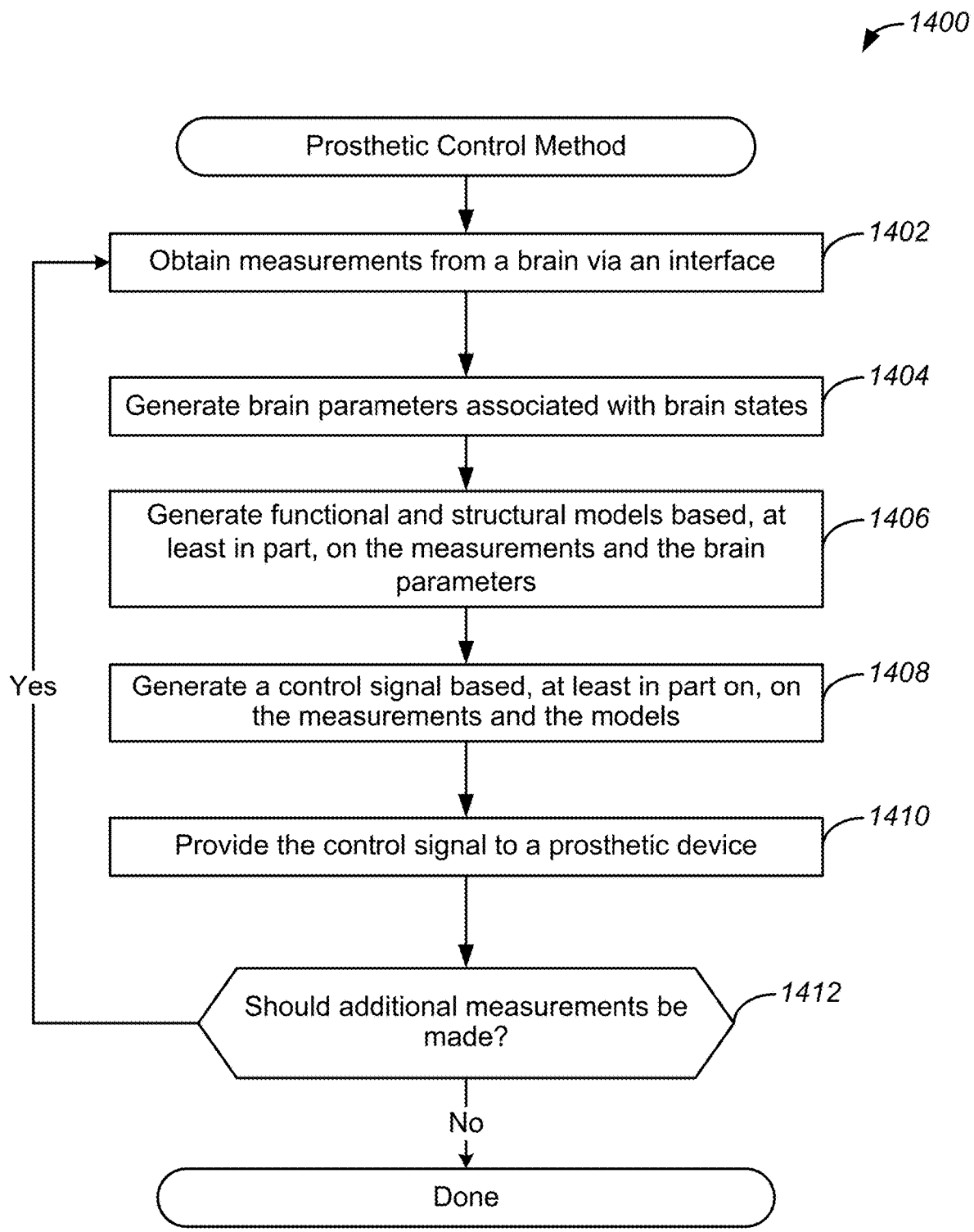
FIG. 14 illustrates a flowchart of an example of a method for control of a prosthetic, implemented in accordance with some embodiments.

FIG. 14 is a flow chart of a method for control a prosthetic. As discussed above, various components of system 1400 may be configured to control various other entities, such as prosthetics, which may be embedded prosthetics, based on the measured neural activity of a user.

At step 1402 measurements are obtained from a brain via an interface. Such measurements may represent neural activity over a particular period of time, or temporal window, and may be obtained via components of a brain interface. In various embodiments, the neural activity may be associated with a particular prosthetic, and the acquisition of such measurements may be implemented responsive to detection of an event or one or more other conditions.

At step 1404 parameters associated with brain states are generated. Such parameters may include observers and estimators associated with brain states as well as identification of the brain states themselves. As also discussed above, such parameters may be utilized to identify one or more brain states associated with the prosthetic. For a prosthetic associated with epileptic seizures, parameters may be generated that may be utilized to identify brain state signatures indicative of an onset of an epileptic seizure.

At step 1406 functional and structural models are generated based, at least in part, on the measurements and the parameters. As discussed above, such models may emulate functions, tasks, and components of the user's brain, and may be configured based on the brain's activity and behavior. Such models may also be configured based on previously obtained reference data and/or previously obtained measurements.

At step 1408 a control signal is generated based, at least in part on, on the measurements and the models. Accordingly, one or more control signals may be generated based on recent neural activity represented by measurement data. In this way, specific control signals may be generated to implement a particular functionality of the prosthetic that is responsive to the identified brain states.

At step 1410 the control signal is transmitted to the prosthetic. Accordingly, the control signal may be provided directly to the prosthetic from a controller, or may be provided via an interface. Moreover, the prosthetic may implement one or more operations responsive to receiving the control signal. In this way, the control signal may be implemented by the prosthetic and functionalities provided by the prosthetic may be implemented.

At step 1412 it may be determined if additional measurements should be made. Such a determination may be made based on a current state, or in response to one or more conditions. For example, additional measurements may be made responsive to the activation of the prosthetic or according to a predetermined schedule. If it is determined that additional measurements should be made, the process may return to operation 1402. If it is determined that no additional measurements should be made, method 1400 may terminate.

Figure 15:
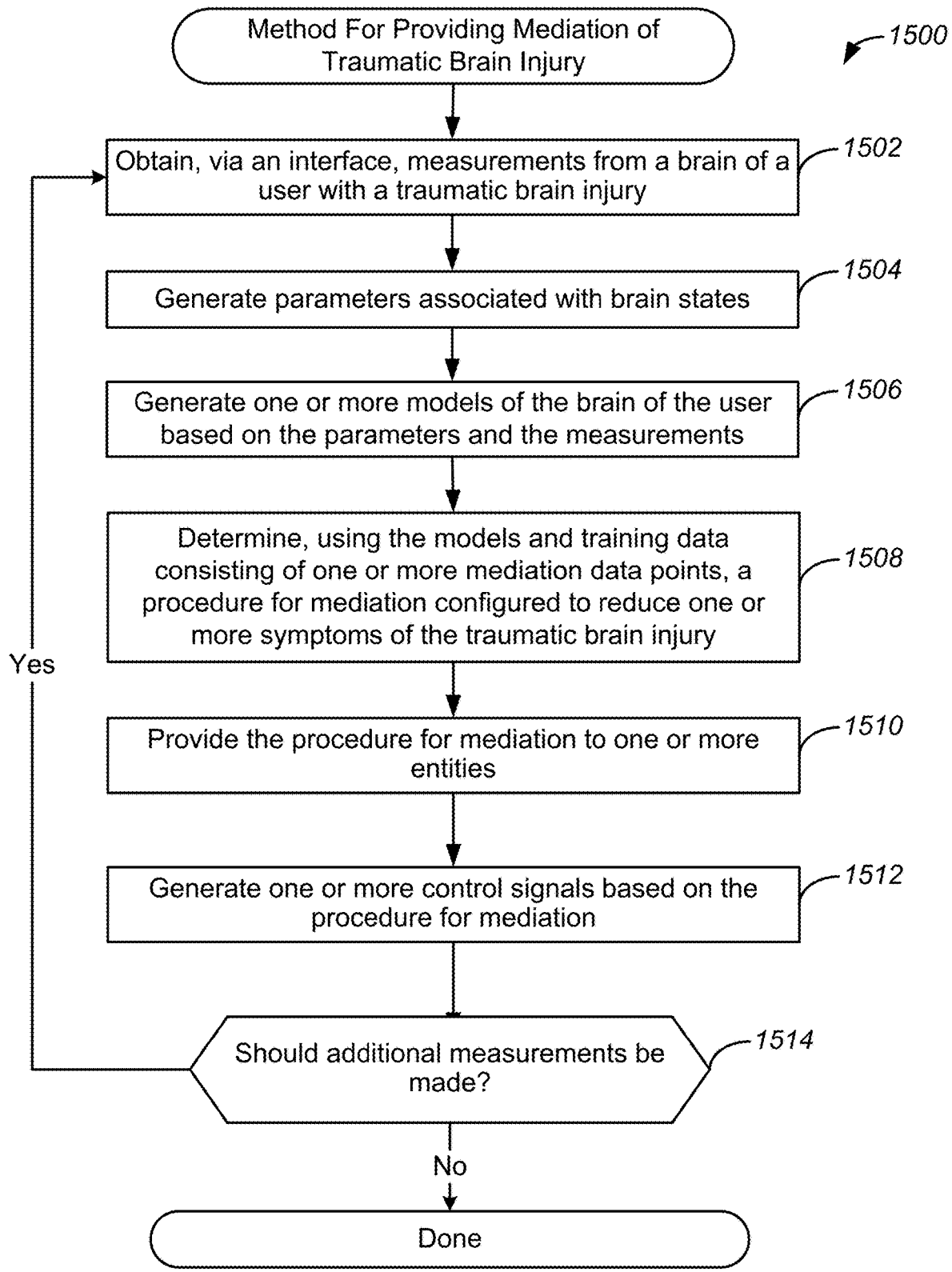
FIG. 15 illustrates a flowchart of an example of a method for providing mediation of traumatic brain injury, implemented in accordance with some embodiments.

FIG. 15 is a flow chart of a method for providing mediation or alleviation of traumatic brain injury, implemented in accordance with some embodiments. As discussed above, various components of system 1100 may be configured to provide mediation of traumatic brain injury.

At step 1502 measurements are obtained from a brain via an interface. The measurements may be obtained from a brain of a user with a neural condition, such as insomnia. In some examples, the neural condition is a traumatic brain injury. In some embodiments, the neural condition may be, for example, epilepsy, depression, insomnia or any other condition with respect to the brain. The measurements may represent neural activity over a particular period of time, or temporal window, and may be obtained via components of a brain interface, described above. Such measurements may be acquired and stored in a memory.

At step 1504 brain state parameters, or parameters associated with brain states, are generated. As discussed above, such parameters may include observers and estimators associated with brain states as well as identification of the brain states themselves. Such parameters may be generated by a first processing device and may be stored in a local memory.

At step 1506 functional and structural models are generated partially based on the measurements and the parameters. Such models may emulate functions, tasks, and components of the user's brain, and may be configured based on the brain's activity and behavior. Such models may also be configured based on previously obtained reference data.

At step 1508 a procedure for mediation is determined. In some embodiments, the procedure for mediation is reducing one or more symptoms of a neural condition, such as traumatic brain injury of the user or insomnia. In some embodiments, the models of the brain are used to determine the procedure for mediation. In some embodiments, training data is used, with the training data consisting of one or more mediation data points. In some embodiments, the mediation data points include one or more models of additional users' brains, or one or more previous procedures for mediation of traumatic brain injury. In some embodiments, the training data is used in conjunction with machine learning algorithms or artificial intelligence modalities. In some embodiments, the machine learning algorithms or artificial intelligence modalities determine a procedure for mediation based on one or more data points within the training data that are determined to suggest a procedure for mediation that alleviates one or more symptoms of traumatic brain injury or insomnia. For example, if data points of previous mediation of traumatic brain injuries of users suggest, via machine learning algorithms, a method that leads to optimal mediation of brain injury, then a procedure for mediation can be determined based on those data points.

At step 1510 mediation is provided to one or more entities. In some embodiments, the one or more entities may be, for example, client devices, user devices, first processing device 1104, second processing device 1106, controller 1108, one or more external applications or websites, or some combination thereof.

At step 1512 a control signal is generated partially based on the brain state parameters and the models to determine a procedure for mediation. Accordingly, one or more control signals may be generated based on recent neural activity represented by measurement data, and also based on expected or desired effects as determined based on the models. In this way, specific control signals may be generated to implement a particular cognitive modulation that is specifically configured for the user. Moreover, as discussed above, such control signals may be generated and implemented in a closed loop manner.

At step 1514 is determined if additional measurements should be made. In various embodiments, such a determination may be made based on a current state, or in response to one or more conditions. For example, if a particular therapeutic regimen is implemented, a series of measurement may be made according to a predetermined schedule, and such measurements may be stepped through utilizing a state machine. If it is determined that additional measurements should be made, the process may return to step 1502. If it is determined that no additional measurements should be made, the process may terminate.

Figure 16:
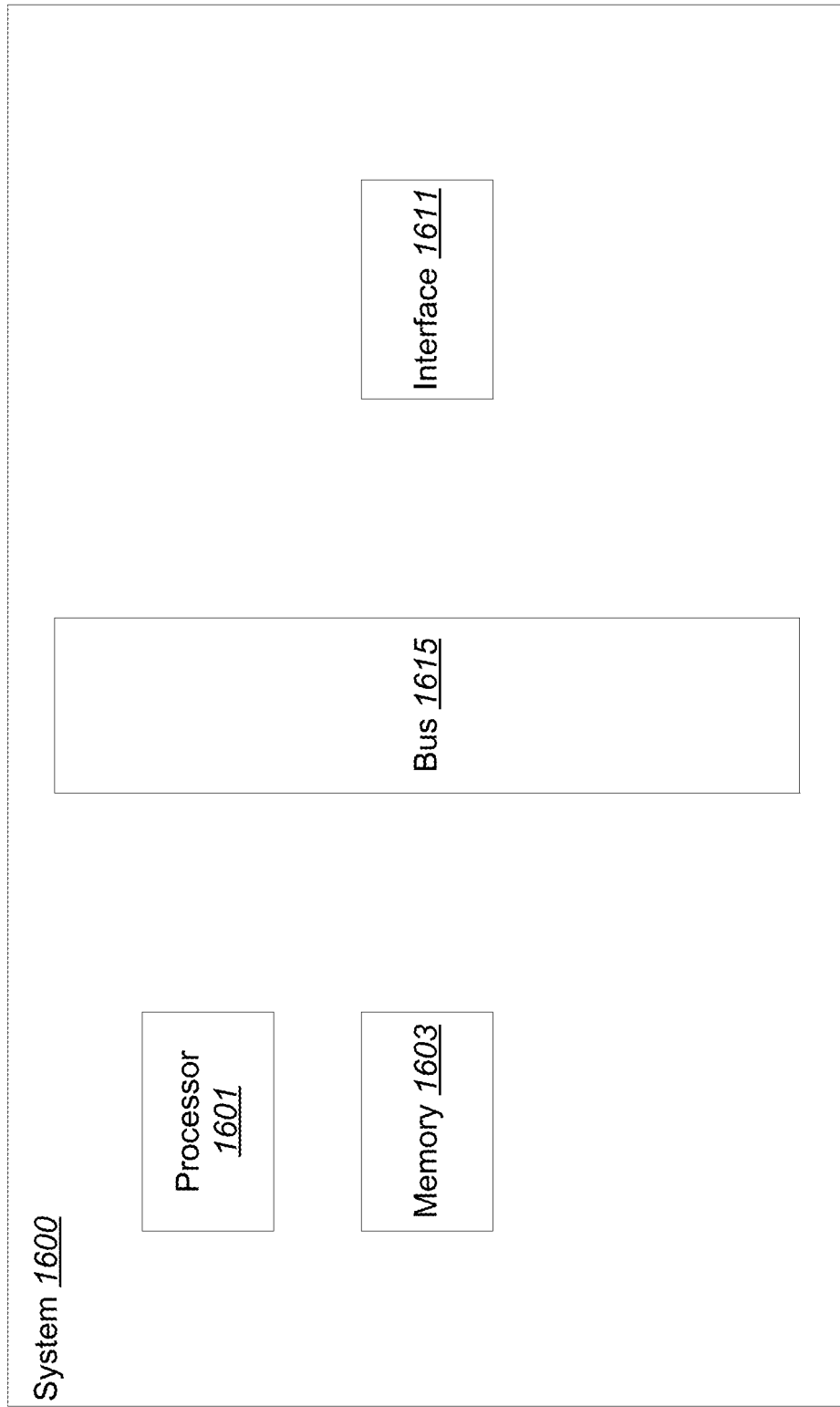
FIG. 16 illustrates an example of a computer system that can be used with various embodiments.

FIG. 16 illustrates an example of a computer system that can be used with various embodiments. For instance, the computer system 1600 can be used to implement first processing device 104, second processing device 1106, controller 1108, and/or prosthetic 1112 according to various embodiments described above. In addition, the computer system 1600 shown can represent a computing system on a mobile device or on a computer or laptop, etc., such as client device 1110. According to particular example embodiments, a system 1600 suitable for implementing particular embodiments of the present invention includes a processor 1601, a memory 1603, an interface 1611, and a bus 1615 (e.g., a PCI bus).

When acting under the control of appropriate software or firmware, the processor 1601 is responsible for tasks such as closed loop control. Various specially configured devices can also be used in place of a processor 1601 or in addition to processor 1601. The complete implementation can also be done in custom hardware.

The interface 1611 may include separate input and output interfaces, or may be a unified interface supporting both operations. The interface 1611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1600 uses memory 1603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A system comprising:
an interface configured to obtain a plurality of measurements from a brain of a user with a traumatic brain injury;
one or more processors configured to:
generate a plurality of brain state parameters characterizing one or more features of at least one brain state of the brain of the user using one or more observers and estimators that form a basis for the generated plurality of brain state parameters, wherein the one or more observers and estimators are used to identify a resonance frequency of electrical neural activity associated with the one or more features of the at least one brain state of the brain of the user;
generate one or more models of the brain of the user using machine learning based on the plurality of brain state parameters and the plurality of measurements; and
determine, using the one or more models of the brain of the user and training data comprising one or more mediation data points comprising one or more machine learning models of at least one additional user's brains, a procedure for mediation configured to reduce one or more symptoms of the traumatic brain injury;
a controller configured to generate one or more control signals based on the procedure for mediation; and
electrodes configured to receive the one or more control signals and electrically stimulate the brain of the user based on the one or more control signals.

2. The system of claim 1, wherein the plurality of brain state parameters identifies features of a plurality of brain states, and wherein each brain state of the plurality of brain states identifies one or more identified patterns of neural activity.

3. The system of claim 2, wherein the one or more processors are configured to generate the one or more observers and estimators associated with the plurality of brain states.

4. The system of claim 3, wherein the one or more models of the brain of the user are functional and structural models of the brain of the user.

5. The system of claim 3, wherein the one or more processors are further configured to monitor neuronal synchronization and desynchronization based on the plurality of measurements.

6. The system of claim 3, wherein the one or more processors are further configured to detect multiplexed parallel delta to theta, alpha to beta, delta/theta/alpha to high-frequency-band coupling based on the plurality of measurements.

7. The system of claim 3, wherein the controller is configured to use closed loop control in the generation of the one or more control signals, wherein the closed loop control is based on the plurality of brain state parameters.

8. The system of claim 1, wherein the system further comprises:
a client device configured to communicate with the one or more processors via a communications network.

9. The system of claim 1, wherein the system further comprises:
a prosthetic device configured to receive one or more control signals from the controller.

10. A method comprising
receiving a plurality of measurements via an interface, the plurality of measurements being associated with neural activity of a brain of a user with a traumatic brain injury;
generating, using one or more processors, a plurality of brain state parameters characterizing one or more features of at least one brain state of the brain of the user using one or more observers and estimators that form a basis for the generated plurality of brain state parameters, wherein the one or more observers and estimators are used to identify a resonance frequency of electrical neural activity associated with the one or more features of the at least one brain state of the brain of the user;
generating, using the one or more processors, one or more models of the brain of the user using machine learning based on the plurality of brain state parameters and the plurality of measurements,
determining, using the one or more models of the brain of the user and training data comprising one or more mediation data points comprising one or more machine learning models of at least one additional user's brains, a procedure for mediation configured to reduce one or more symptoms of the traumatic brain injury;
generating, using the one or more processors, one or more control signals based on the procedure for mediation; and
electrically stimulating, using an electrode, the brain of the user based on the one or more control signals.

11. The method of claim 10, wherein the plurality of brain state parameters identifies features of a plurality of brain states, and wherein each brain state of the plurality of brain states identifies one or more identified patterns of neural activity.

12. The method of claim 11, further comprising generating the one or more observers and estimators associated with the plurality of brain states.

13. The method of claim 12, wherein the one or more models of the brain of the user are functional and structural models of the brain of the user.

14. The method of claim 12, further comprising:
monitoring neuronal synchronization and desynchronization based on the plurality of measurements.

15. The method of claim 12 further comprising:
detecting multiplexed parallel delta to theta, alpha to beta, delta/theta/alpha to high-frequency-band coupling based on the plurality of measurements.

16. A non-transitory computer-computer readable medium having stored thereon instructions to cause at least one processor to execute a method, the method comprising:
receiving a plurality of measurements via an interface the plurality of measurements being associated with neural activity of a brain of a user with a traumatic brain injury;
generating, using the at least one processor, a plurality of brain state parameters characterizing one or more features of at least one brain state of the brain of the user using one or more deterministic observers and stochastic estimators that form a basis for the generated plurality of brain state parameters, wherein the one or more observers and estimators are used to identify:

an oscillation or a resonance frequency of electrical neural activity associated with at least one of the plurality of brain state parameters; and a coupling between patterns of neural activity or weighting factor associated with one or more other brain states;

identifying the resonance frequency of the at least one of the plurality of brain state parameters;

generating, using the at least one processor, one or more models of the brain of the user using machine learning based on the plurality of brain state parameters, the oscillation or resonance frequency of the at least one of the plurality of brain state parameters, the coupling or weighting factor associated with one or more other brain states, and the plurality of measurements, determining, using the one or more models of the brain of the user and training data comprising one or more mediation data points comprising one or more machine learning models of at least one additional user's brains, a procedure for mediation configured to reduce one or more symptoms of the traumatic brain injury;

generating, using the at least one processor, one or more control signals based on the procedure for mediation; and transmitting the generated one or more control signals to an electrode to electrically stimulate the brain of the user based on the one or more control signals.

17. The system of claim 1, wherein the one or more processors are configured to generate the plurality of brain state parameters using the one or more observers and estimators that are deterministic observers and stochastic estimators.

18. The system of claim 17, wherein:
the deterministic observers provide robustness to exogenous disturbances; and
the stochastic estimators provide robustness associated with noise.

19. The system of claim 1, wherein the one or more processors are configured to identify an oscillation or resonance frequency of at least one of the plurality of brain state parameters using the observers and estimators.

20. The system of claim 1, wherein at least one of the plurality of measurements are generated in a dynamically changing time window where a size of the time window is dynamically changed based on a previously generated one of the plurality of measurements.

* * * * *